(12) United States Patent
Janakiraman

(10) Patent No.: US 12,443,515 B1
(45) Date of Patent: Oct. 14, 2025

(54) CONTEXT ENGINE TEST GENERATION

(71) Applicant: Dropbox, Inc., San Francisco, CA (US)

(72) Inventor: Rajkumar Janakiraman, Sammamish, WA (US)

(73) Assignee: Dropbox, Inc., San Francisco, CA (US)

( * ) Notice: Subject to any disclaimer, the term of this patent is extended or adjusted under 35 U.S.C. 154(b) by 29 days.

(21) Appl. No.: 18/749,893

(22) Filed: Jun. 21, 2024

Related U.S. Application Data

(60) Provisional application No. 63/632,833, filed on Apr. 11, 2024.

(51) Int. Cl.
G06F 11/3668 (2025.01)
G06F 8/30 (2018.01)

(52) U.S. Cl.
CPC ............ *G06F 11/3684* (2013.01); *G06F 8/30* (2013.01); *G06F 11/3688* (2013.01)

(58) Field of Classification Search
CPC .... G06F 11/36–3696; G06F 8/30; G06F 8/35; G06F 11/3698; G06N 20/00–20
See application file for complete search history.

(56) References Cited

U.S. PATENT DOCUMENTS

| | | | |
|---|---|---|---|
| 7,647,587 B2 * | 1/2010 | Knoblock | G06F 8/73 717/148 |
| 8,180,659 B2 | 5/2012 | Atkin et al. | |
| 9,002,895 B2 | 4/2015 | Doig et al. | |
| 9,027,075 B2 * | 5/2015 | Driscoll | G06F 21/54 726/1 |
| 9,239,708 B2 | 1/2016 | Tillmann et al. | |
| 10,339,927 B2 | 7/2019 | Talwar et al. | |
| 10,515,002 B2 * | 12/2019 | Takawale | G06F 11/3688 |
| 10,747,651 B1 | 8/2020 | Vanderwall et al. | |
| 11,003,704 B2 | 5/2021 | Paulus | |
| 11,061,806 B2 * | 7/2021 | Viswanathan | G06F 8/71 |
| 11,770,296 B2 | 9/2023 | Nolan et al. | |
| 11,893,363 B2 * | 2/2024 | Drain | G06F 17/18 |

(Continued)

FOREIGN PATENT DOCUMENTS

CN 117492726 A * 2/2024

OTHER PUBLICATIONS

Machine Translation of CN117492726, Espacenet [online], 2024 [retrieved Aug. 16, 2024], Retrieved from Internet: <URL: https://worldwide.espacenet.com/publicationDetails/biblio?CC=CN&NR=117492726A&KC=A&FT=D&ND=3&date=20240202&DB=EPODOC&locale=en_EP>, pp. 1-18.*

(Continued)

*Primary Examiner* — Todd Aguilera
(74) *Attorney, Agent, or Firm* — Keller Preece PLLC

(57) ABSTRACT

The present disclosure is directed toward systems, methods, and non-transitory computer-readable media for generating function code and test code to determine that the function code satisfies an intent query. For example, the disclosed systems utilize a large language model to process an intent query and generate function code that defines one or more processes whose execution satisfies the intent query. In addition, the disclosed systems also utilize the large language model to generate test code that defines a function test for determining that the function code satisfies the intent query. Moreover, the disclosed systems can execute the test code to determine that the function code satisfies the intent query.

20 Claims, 12 Drawing Sheets

(56) References Cited

U.S. PATENT DOCUMENTS

| | | | |
|---|---|---|---|
| 11,921,815 | B2 | 3/2024 | Polleri et al. |
| 11,921,985 | B2 | 3/2024 | Paley et al. |
| 12,099,975 | B1* | 9/2024 | Cai .................... G06Q 10/1053 |
| 2005/0081194 | A1* | 4/2005 | Knoblock ................. G06F 8/73 |
| | | | 717/118 |
| 2013/0086625 | A1* | 4/2013 | Driscoll .................... G06F 8/40 |
| | | | 726/1 |
| 2019/0213115 | A1* | 7/2019 | Takawale ........... G06F 11/3692 |
| 2021/0056007 | A1* | 2/2021 | Viswanathan ...... G06F 11/3688 |
| 2021/0279577 | A1 | 9/2021 | West et al. |
| 2022/0066747 | A1* | 3/2022 | Drain .................... G06N 5/046 |
| 2022/0374793 | A1 | 11/2022 | Jezewski |
| 2023/0100333 | A1 | 3/2023 | Reynolds et al. |
| 2024/0111498 | A1* | 4/2024 | Vaughn ...................... G06F 8/30 |
| 2024/0361996 | A1* | 10/2024 | Fu ............................. G06F 8/73 |
| 2024/0362209 | A1* | 10/2024 | Almaer .............. G06F 16/2433 |

OTHER PUBLICATIONS

Nashid, N., et al., "Retrieval-Based Prompt Selection for Code-Related Few-Shot Learning", 2023 IEEE/ACM 45th Int'l Conf. on Software Engineering (ICSE), 2023 [retrieved Nov. 23, 2024], Retrieved from Internet: <URL: https://ieeexplore.ieee.org/abstract/document/10172590>, pp. 2450-2462.*

\* cited by examiner

CONTEXT ENGINE TEST GENERATION

CROSS-REFERENCE TO RELATED APPLICATIONS

This application claims priority to and the benefit of U.S. Provisional Patent Application No. 63/632,833, filed on Apr. 11, 2024, which is incorporated herein by reference in its entirety.

BACKGROUND

Advancements in computing devices and networking technology have given rise to a variety of innovations in machine learning and network-based digital assistants. Over time, computing systems have been developed that generate computer code across a variety of computer languages in response to a user query. For instance, some existing systems can receive a prompt describing a method or function and can automatically generate computer code defining the method or function. Despite these advances, however, existing systems continue to suffer from a number of disadvantages, particularly in terms of security, efficiency, accuracy, and flexibility.

As just mentioned, some existing code generation systems are insecure. While certain existing systems can generate executable computer code from a prompt, these systems generally generate such code in a vacuum, irrespective of contextual testing data for a target system that might execute the code. Without testing generated code across various possible test cases to test the generated code in the context of execution by a target system, existing systems are thus susceptible to generating hazardous or harmful computer code (or code that performs otherwise unauthorized processes) that compromises the security and/or stability of a target system executing the code.

As a result of their insecurities and/or instabilities, certain existing systems are also inefficient. For example, some existing systems take measures to alleviate or remedy code insecurities or instabilities by first deploying code to dedicated testing devices before sending it to target systems for execution or implementation. This approach of testing computer code at testing devices is generally very time intensive and computationally expensive. Indeed, to perform tests at testing devices, existing systems loop in engineers to write test code for testing the generated computer code. However, writing and running engineer-generated test code for various test cases consumes excessive amounts of processing power and memory across numerous testing devices, and the computational expense only grows as the complexity of the generated code and/or the number of test cases (and testing devices) increases.

In addition to their insecurity and inefficiency issues, existing systems are also inaccurate. More particularly, due to the standard paradigm of relying on individual test devices to create and run tests for generated computer code, existing systems typically fail to test generated code extensively or exhaustively. Such incomplete or inadequate testing can result in computer code that inaccurately addresses an intent (expressed by an input prompt) and/or that is operationally invalid, including syntactic errors, semantic errors, and/or logical errors.

Relatedly, existing systems further suffer from operational inflexibility. Because existing systems are limited to testing generated code for test cases expressly coded by engineers at testing devices, these existing systems fail to adapt tests to newly generated computer code and/or to new tests cases that arise. Indeed, the inflexible nature of manually coding tests for each test case severely hampers the ability of existing systems to keep up with each new generated code segment (as each new code segment likely necessitates its own custom test cases).

SUMMARY

This disclosure describes one or more embodiments of systems, methods, and non-transitory computer-readable storage media that provide benefits and/or solve one or more of the foregoing and other problems in the art. For instance, the disclosed systems generate function code and test code defining a function test for determining that the function code satisfies an intent query. In some cases, the disclosed systems generate the function code and the test code utilizing a context engine in conjunction with a large language model. For example, the disclosed systems generate function code defining one or more processes whose execution satisfies the intent query, and the disclosed systems further generates the test code to determine that the function code does satisfy the intent query. In doing so, the disclosed systems scales up (e.g., extensive) testing of generated function code to a magnitude and volume greater than existing systems.

BRIEF DESCRIPTION OF THE DRAWINGS

This disclosure will describe one or more example implementations of the systems and methods with additional specificity and detail by referencing the accompanying figures. The following paragraphs briefly describe those figures, in which.

DETAILED DESCRIPTION

Figure 1:
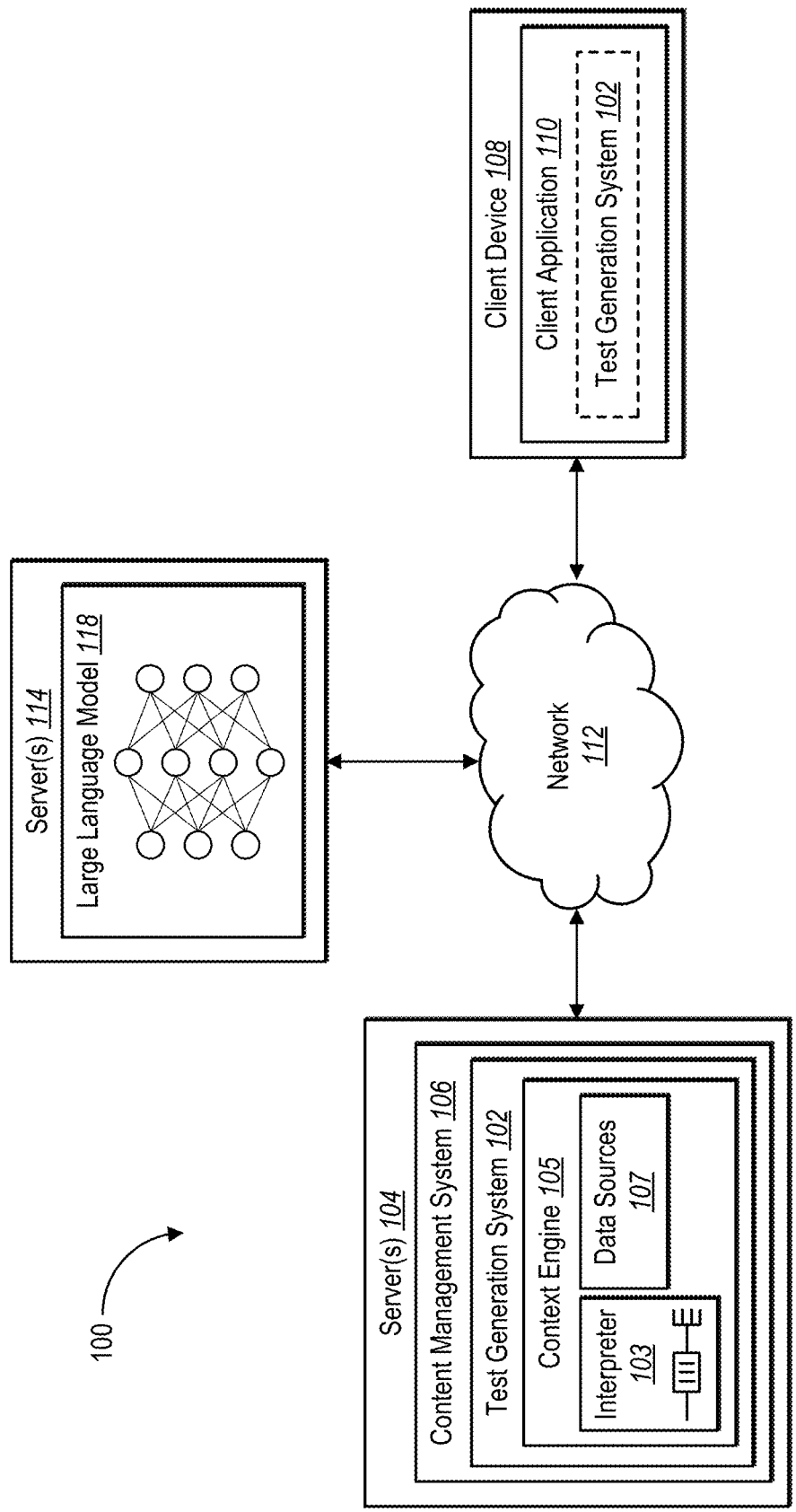
FIG. 1 illustrates a schematic diagram of an example environment of a test generation system in accordance with one or more embodiments.

This disclosure describes one or more embodiments of a test generation system that can implement a context engine with a large language model to generate and run tests for computer code. For example, the test generation system utilizes the foundational architecture of a context engine to generate test code along with function code by generating custom prompts for a large language model. Specifically, the test generation system utilizes the context engine to generate a code generation prompt that causes a large language model to generate executable function code as well as test code for testing the function code across various test cases. For instance, the test generation system generates test code and function code in tandem. In addition, the test generation system runs the test code to test the function code as a quality control mechanism for various test cases, including validity checks (e.g., syntax checks) and/or ensuring that the function code appropriately responds to an intent query.

In one or more embodiments, the test generation system generates test code by using a large language model fine-tuned for generating test code. Indeed, the test generation system can fine-tune a large language model for generating test code to accompany function code. For example, the test generation system fine-tunes the large language model with a sample ("golden") set of engineer-generated test code segments corresponding to respective intents (e.g., to form an example training set of code-intent pairs). Thus, according to the fine-tuned parameters of the large language model, the test generation system generate test code from an input intent.

As mentioned, the test generation system can also execute the test code to test the function code generated by the context engine. Specifically, the test generation system executes the test code to test the function code prior to deployment. For instance, the test generation system executes the test code to determine whether functions, definitions, or logic of the function code is correctly defined to generate an output that satisfies the intent query. Additionally, the test generation system executes the test code to determine whether the function code contains malicious or harmful processes (e.g., unauthorized operations).

In addition, the test generation system can validate test code (e.g., prior to execution). Validating test code can include verifying that the code is compile-able, executable, and/or otherwise properly constructed (e.g., syntactically, semantically, and/or logically sound). Specifically, the test generation system can utilize a specialized computer program called an interpreter (e.g., which can integrate with various external executors, programs, or applications, such as a compiler) to preliminarily test the test code (e.g., at test time prior to execution at runtime). The test generation system can thus ensure that the function code is safe for execution at run time. In other words, the test generation system can run a validation test to validate test code. A validation test can include checks for certain types of errors (e.g., syntax errors and/or logic errors) as well as checks for hazardous code that is otherwise syntactically and logically sound to thus prevent malicious/unsafe test code and/or to prevent hallucinations in test code generated by the large language model.

Moreover, in some embodiments, the test generation system further generates and stores computer software agents that execute tests on function code without regenerating the test code for each new test or each new function code segment. For example, the test generation system can generate a new computer software agent from one or more prior generated test code segments, where the software agent can run the test code against function code without a content engine and/or a large language model. In some cases, a computer software agent can represent or define a collection of intents as an executable program for executing test code segments corresponding to (e.g., previously generated in response to prompts based on) the collection of intents. Thus, rather than having to re-generate test code for a new instance of a previously entered intent, the test generation system identifies and implements a software agent for existing test code that was previously generated for the same intent.

As suggested above, the test generation system can provide several improvements or advantages over existing systems. For instance, in some embodiments, the test generation system improves data security relative to prior systems. As mentioned above, existing code generation systems generate code in a vacuum (e.g., without contextually testing code for a target system) and are thus susceptible to generating hazardous or harmful code that jeopardizes the security and stability of a target system. In contrast, the test generation system generates test code to accompany (e.g., at the same time as) function code using a context engine integrated with a large language model. In doing so, the test generation system can ensure that the test code is contextually relevant to the function code. Moreover, for each generated function code, the test generation system can generate multiple test codes to test the function code for multiple test cases (e.g., the test generation system extensively tests the function code for a specific target system) to identify coding errors in the function code for improved security and/or stability.

Additionally, the test generation system rectifies issues of generating hazardous or harmful code by validating the generated test code to prevent unauthorized processes (e.g., reading, writing, or deleting files in an unauthorized manner). For instance, the test generation system can utilize an interpreter to preliminarily evaluate the test code at an executor compiler, where the interpreter tests whether the function code contains invalid or unsafe/malicious operations. Thus, the test generation system not only test function code using test code but also validates the test code itself using an interpreter.

In addition to improving upon security, the test generation system also improves upon efficiency as compared to prior systems. As mentioned above, existing code generation systems deploy code to dedicated (engineer-operated) testing devices prior to sending the code to target system for execution or implementation. In contrast to existing code generation systems (e.g., that consume excessive amounts of processing power and memory across numerous testing devices), the test generation system utilizes the context engine (e.g., integrated with the large language model) to generate both function code and test code for an intent query to directly test whether the generated function code satisfies the intent query. The test generation system thus saves computational resources on testing devices by eliminating or reducing the number of testing devices in a code generation and testing workflow.

For instance, by generating the test code at the same time as the function code, the test generation system adapts to increases in the number and/or types of test cases for different function codes. Indeed, the test generation system does not have to outsource testing capabilities to an excessive number of testing devices and can directly evaluate the function code at the time of generating the function code. Accordingly, the test generation system conserves both time and computational resources by generating (multiple segments of) test code that tests function code for any number of use cases.

Furthermore, in some embodiments the test generation system improves accuracy relative to prior systems. As mentioned above, existing code generation systems rely on teams of testing devices to create tailored code for testing function code corresponding to an intent query. In contrast, the test generation system utilizes the context engine integrated with the large language model to generate test code from the same prompt as function code. In doing so, the test generation system generates test code that closely relates to function code for more extensive or exhaustive testing of syntactic, semantic, and/or logical errors. Moreover, the test generation system can utilize an interpreter to preliminarily test the test code to prevent unauthorized/inaccurate processes from occurring and to identify syntactic, semantic, and/or logical errors.

Due at least in part to improving security, efficiency, and accuracy, the test generation system also improves upon operational flexibility. While conventional systems are rigidly limited to testing generated code for test cases expressly coded by engineers at testing devices, the test generation system generates test code from the same prompt as function code. As such, the test generation system executes the test code to determine that the function code satisfies the intent query. Accordingly, the test generation system covers a wide range of testing new code segments that result from an increase in new intent queries.

Moreover, in some instances, the test generation system further improves upon operation flexibility by adapting to updates or different versions of a large language model. Specifically, existing test generation systems typically generate computer code that breaks because the generated computer code is not adaptable to changes applied to a large language model. In contrast, the test generation system utilizes the context engine to generate prompts for a large language model according to the intent query. Specifically, the context engine is strongly typed and thus compatible with different updates or versions applied to a large language model. In other words, the test generation system generates computer code utilizing the context engine and the functional validity of the generated computer code persists across different versions of the large language model.

As illustrated by the foregoing discussion, the present disclosure utilizes a variety of terms to describe features and benefits of the test generation system. Additional detail is hereafter provided regarding the meaning of these terms as used in this disclosure. As used herein, the term "intent query" includes or refers to data or a specific model input defining a multi-order intent entered via a client device. In particular, an intent query can include an expression of a long-term goal or a target objective associated with a user account or a computer system. For example, an intent query includes an intent of a user device such as an intent of determining a number of attendees in a specific meeting, or an intent of determining a next meeting. In some cases, an intent query is decomposable or deconstruct-able into multiple processes or tasks that make up the overall intent and that are individually executable.

Moreover, in some embodiments, an intent query is a text query and the intent query can contain one or more orders. Specifically, an "order" of the intent query refers a number of tasks or processes required to accomplish an overall target objective expressed by the intent query. For example, a multi-order (or high-order) intent query can be split, divided, or deconstructed into multiple single order prompts. By contrast, first order intent query causes the test generation system to utilize a large single prompt for a language model to generate a single-process output. For instance, the test generation system generates the single-process output that includes computer code executable by software applications or programs to perform individual functions. Additionally, a second order intent query causes the test generation system to utilize a large language model to generate a two-process output.

As mentioned, the test generation system provides the intent query (e.g., as a text prompt) to a large language model for generating function code. As used herein, the term "function code" refers to a set of instructions written in a programming language that a computing device can interpret and execute to perform a specific task. Function code can include a series of statements and functions that define specific operations or processes performed by a computer upon execution of the code. In some cases, function code includes statements written in specific syntax and translatable into machine code to be executed by a computing device for performing one or more processes of an overall intent.

In some embodiments, the test generation system generates domain-specific language from the intent query. As mentioned, in some instances, the intent query is decomposable or deconstruct-able into multiple processes or tasks where each process or task refers to a different domain. As such, the test generation system generates domain-specific language for the intent query as a whole or for each process or task that refers to a different domain. As used herein, a "domain-specific language" refers to plain language descriptions and/or computer code referencing one or more data sources and further corresponds to and/or indicates a data source (e.g., external applications/systems/databases).

In one or more embodiments, the test generation system also generates test code in addition to the function code. As used herein, the term "test code" refers to computer code that defines a function test for function code. For example, text code can include one or more code segments for determining that the function code satisfies an intent query. In some cases, the test generation system utilizes test code to test function code. For example, the test generation system generates the test code that includes computer code for testing whether the output of function code satisfies an intent query. In some embodiments, test code can also test for different types of errors (e.g., syntax errors and logic errors) and/or for hazardous or harmful function code. As mentioned above, the intent query is decomposable or deconstruct-able into multiple processes or tasks. For instance, function code can be broken down into multiple processes that each reference/correspond to a data source and the test generation system can execute the test code to test whether an individual process or task of the function code at a specific data source satisfies the intent query.

As used herein, the term "context engine" includes or refers to a model (e.g., a machine learning model) that works in conjunction with a large language model to break down text queries into individual prompts and to generate computer code from the prompts. For instance, a context engine determines the order of a text query and breaks the query into a set of first-order prompts. The context engine can further combine outputs generated from each first-order prompt into a context engine output responsive to the initial query (e.g., the intent query). Moreover, the context engine contains types of variables that are checked at compile time, thus the context engine verifies the types of variables and expressions at compile time to catch errors prior to the execution of computer code. Further, the context engine contains explicit type declarations, which reduces the likelihood of errors (e.g., the types are self-documented within the computer code). To illustrate, the test generation system utilizes the context engine as described by Rajkumar Janakiraman in U.S. patent application Ser. No. 18/309,496, titled GENERATING MULTI-ORDER TEXT QUERY RESULTS UTILIZING A CONTEXT ORCHESTRATION ENGINE, which is hereby incorporated by reference in its entirety.

As mentioned above, the context engine includes or refers to a machine learning model. In one or more embodiments a "machine learning model" includes a computer algorithm or a collection of computer algorithms that can be trained and/or tuned based on inputs to approximate unknown functions. For example, a machine learning model can include a computer algorithm with branches, weights, or parameters that changed based on training data to improve for a particular task. Thus, a machine learning model can utilize one or more learning techniques to improve in accuracy and/or effectiveness. Example machine learning models include various types of decision trees, support vector machines, Bayesian networks, random forest models, or neural networks (e.g., deep neural networks).

Similarly, a "neural network" includes a machine learning model of interconnected artificial neurons (e.g., organized in layers) that communicate and learn to approximate complex functions and generate outputs based on a plurality of inputs provided to the model. In some instances, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a transformer neural network, a generative adversarial neural network, a large language model, a graph neural network, a diffusion neural network, or a multi-layer perceptron. In some embodiments, a neural network includes a combination of neural networks or neural network components.

Along these lines, the test generation system utilizes the context engine to interact with a large language model. As used herein, the term "large language model" includes or refers to one or more neural networks capable of processing natural language text to generate outputs that range from predictive outputs, analyses, or combinations of data within stored content items. In particular, a large language model can include parameters trained (e.g., via deep learning) on large amounts of data to learn patterns and rules of language for summarizing and/or generating digital content. Examples of large language model include BLOOM, Bard AI, ChatGPT, LaMDA, DialoGPT, DropboxGPT, and Dropbox FileGPT.

As mentioned above, the test generation system 102 utilizes an interpreter to run computer code generated by a large language model. As used herein, the term "interpreter" includes or refers to a software or application program that reads and executes computer code (e.g., source code) written in a high-level programming language. For instance, the interpreter can read computer code line by line, statement by statement, or instruction by instruction and can execute the code without converting into machine code. In some cases, an interpreter can also or alternatively translate the computer code into machine code or another representation. Moreover, in some instances the interpreter does not utilize a separate compilation step to run computer code. To illustrate, the test generation system utilizes the interpreter as described by James Johnson in U.S. patent application Ser. No. 18/482,715, titled CUSTOM INTERPRETER FOR EXECUTING COMPUTER CODE GENERATED BY A LARGE LANGUAGE MODEL, which is hereby incorporated by reference in its entirety.

Additional detail regarding the test generation system will now be provided with reference to the figures. For example, FIG. 1 illustrates a schematic diagram of an example system environment for implementing a test generation system 102 in accordance with one or more implementations. An overview of the test generation system 102 is described in relation to FIG. 1. Thereafter, a more detailed description of the components and processes of the test generation system 102 is provided in relation to the subsequent figures.

As shown, the environment 100 includes server(s) 104 with the test generation system 102 that includes a context engine 105 (which further includes an interpreter 103 and data sources 107), server(s) 114, and a client device 108. Each of the components of the environment can communicate via the network 112, and the network 112 may be any suitable network over which computing devices can communicate. Example networks are discussed in more detail below in relation to FIGS. 9-10.

As mentioned above, the example environment includes client device 108. The client device 108 can be one of a variety of computing devices, including a smartphone, a tablet, a smart television, a desktop computer, a laptop computer, a virtual reality device, an augmented reality device, or another computing device as described in relation to FIGS. 9-10. The client device 108 can communicate with the server(s) 104 via the network 112. For example, the client device 108 can receive user input from a user interacting with the client device 108 (e.g., via the client application 110) to, for instance, generate test code for testing function code, modify function code according to indications received from executing the test code, fine-tuning a large language model, and/or to perform additional interactions for modifying the context engine 105 and/or the interpreter 103. In addition, the test generation system 102 on the server(s) 104 can receive information relating to various interactions with content items and/or user interface elements based on the input received by the client device 108.

As shown, the client device 108 can include a client application 110. In particular, the client application 110 may be a web application, a native application installed on the client device 108 (e.g., a mobile application, a desktop application, etc.), or a cloud-based application where all or part of the functionality is performed by the server(s) 104. Based on instructions from the client application 110, the client device 108 can present or display information, including a user interface for interacting with (or collaborating regarding) generating outputs related to the test code or the function code. Using the client application 110, the client device 108 can perform (or request to perform) various operations, such as fine-tuning a large language model, generating test code, and/or generating function code.

As illustrated in FIG. 1, the example environment also includes the server(s) 104. The server(s) 104 may generate, track, store, process, receive, and transmit electronic data, such as intent queries, context engine outputs, function code, test code, interactions with interface elements, and/or interactions between user accounts or client devices. For example, the server(s) 104 may receive an indication from the client device 108 of a user interaction defining an intent query. In addition, the server(s) 104 can transmit data to the client device 108 in the form of an output of executing test code to test function code responsive to an intent query. Indeed, the server(s) 104 can communicate with the client device 108 to send and/or receive data via the network 112. In some implementations, the server(s) 104 comprise(s) a distributed server where the server(s) 104 include(s) a number of server devices distributed across the network 112 and located in different physical locations. The server(s) 104 can comprise one or more content servers, application servers, container orchestration servers, communication servers, web-hosting servers, machine learning server, and other types of servers.

As shown in FIG. 1, the server(s) 104 can also include the test generation system 102 as part of a content management system 106. The content management system 106 can communicate with the client device 108 to perform various functions associated with the client application 110 such as managing user accounts, storing and synchronizing content items, facilitating collaboration among user accounts, defining text queries, refining function code, and/or designating data sources of function code. Indeed, the content management system 106 can include a network-based smart cloud storage system to manage, store, and maintain content items and related data across numerous user accounts. In some embodiments, the test generation system 102 and/or the content management system 106 utilize a database to store and access information such as content items, data sources, text queries, function code, test code, results for text queries, responses to text queries, and other information related to executing test code for testing function code.

As further illustrated, the environment includes the server(s) 114 that hosts a large language model 118. In particular, the large language model 118 communicates with the server(s) 104, the client device 108, and/or a database. For example, the test generation system 102 provides an intent query to the context engine 105 (e.g., which can translate the intent query into domain-specific language segments) and further provides the intent query to the large language model 118 (e.g., where the domain-specific language segments indicate data sources for generating results for various query subcomponents, if the intent query is decomposable into multiple subcomponents). Indeed, the large language model 118 can include a machine learning model powered by neural networks or other machine learning architectures for generating responses to intent queries. For example, the large language model 118 can refer to a ChatGPT model that generates computer-executable code segments for accessing data sources to generate responses for query subcomponents. Moreover, the large language model 118 further generates test code that defines a function test for testing generated computer executable code segments.

Although FIG. 1 depicts the test generation system 102 located on the server(s) 104, in some implementations, the test generation system 102 may be implemented by (e.g., located entirely or in part on) one or more other components of the environment. For example, the test generation system 102 may be implemented by the client device 108 and/or a third-party system. For example, the client device 108 and/or a third-party system can download all or part of the test generation system 102 for implementation independent of, or together with, the server(s) 104.

In some implementations, though not illustrated in FIG. 1, the environment may have a different arrangement of components and/or may have a different number or set of components altogether. For example, the client device 108 may communicate directly with the test generation system 102, bypassing the network 112. The environment may also include one or more third-party systems, each corresponding to a different contextual data source of the data sources 107. In addition, the environment can include a database located external to the server(s) 104 (e.g., in communication via the network 112) or located on the server(s) 104 and/or on the client device 108. In some cases, the server(s) 104 and/or the client device 108 can host or house all or part of the large language model 118. As shown, the server(s) 114 house the large language model 118.

Figure 2:
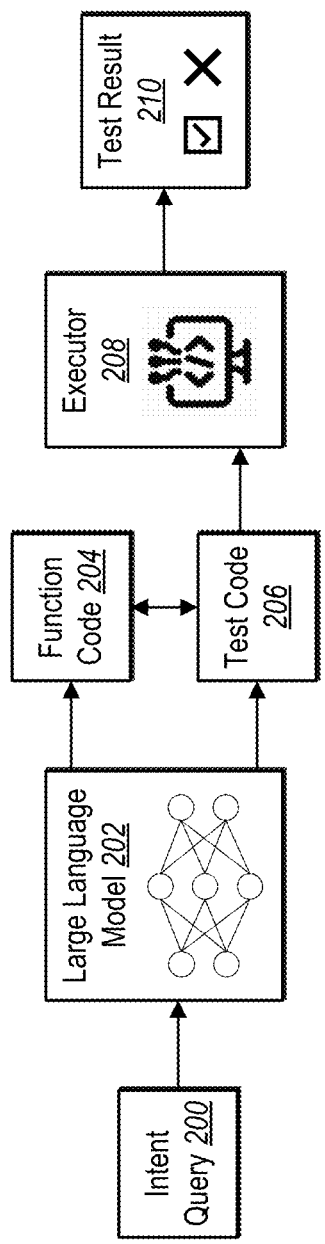
FIG. 2 illustrates an example overview of the test generation system generating function code and test code and executing the test code in accordance with one or more embodiments.

As mentioned above, the test generation system 102 generates function code and test code. Moreover, the test generation system 102 executes the test code to determine that the function code satisfies the intent query. FIG. 2 illustrates the test generation system 102 utilizing a large language model to generate function code and test code together in accordance with one or more embodiments.

As shown, the test generation system 102 receives an intent query 200. An intent query can include a text query which can range from a single order text query to a multi-order text query. As an example of a multi-order intent query, an intent query such as "Who have I spent the most time with this month?" can be broken into multiple subcomponents or discrete processes or tasks that combine to form the overall intent query. To illustrate, the just-mentioned example includes the following set of subcomponents/processes/tasks: (i) querying the content management system 106 for basic details (e.g., metadata such as organizational position, name, and email address) of the user account making the query, (ii) querying a calendar application to determine all meetings attended by the user in the past month, (ii) querying the calendar application to determine all attendees of each meeting in the last month, and (iv) combining the aforementioned subcomponents (e.g., by aggregating results of the first few components and selecting a person that matches the intent query).

For instance, the test generation system 102 receives the intent query 200 in the form of a specific request made by the user device to obtain information. Moreover, in some instances the test generation system 102 extracts data from the intent query 200. Specifically, the test generation system 102 can extract natural language structured programmatic data from the intent query 200. Thus, in some instances the test generation system 102 generates computer code (e.g., utilizing the context engine interacting with the large language model) in response to extracting natural language structured programmatic data from a query. In some instances, the test generation system 102 determines that the intent query 200 is a multi-order query and deconstructs the intent query 200 into multiple tasks/processes to provide to a large language model 202 to generate individual executable tasks/processes that collective accomplish the intent of the intent query 200.

As further illustrated in FIG. 2, the test generation system 102 provides the intent query 200 to the large language model 202. Specifically, the test generation system 102 utilizes the large language model 202 that is fine-tuned to generate test code 206 in conjunction with generating the function code 204. For instance, the test generation system 102 utilizes the large language model 202 to generate the function code 204 for determining the next scheduled meeting for a user account. Further, the test generation system 102 also generates the test code 206 to test the function code 204 in relation to the intent query 200. To illustrate, the test generation system 102 can use the test code 206 to test whether the function code correctly contains an application programming interface call (e.g., hereinafter referred to as API) to a calendar application of the user account or the test generation system 102 can use the test code 206 to test whether the syntax or logic of the function code 204 is correct.

As mentioned, in some instances, the test generation system 102 deconstructs the intent query 200 into multiple subcomponents. As indicated by the double arrow between the function code 204 and the test code 206, the test generation system 102 utilizes the test code 206 to test various portions of the function code 204. Specifically, the test generation system 102 can generate test cases for the intent query 200 of "when is my next meeting" that can include (i) a specific valid response (e.g., the meeting is on a scheduled date and time), (ii) no meetings scheduled, (iii) a test case of determining the specific type of meeting the user is inquiring about, (iv) whether there are multiple meetings scheduled at the same time, (v) a situation where a meeting occurs at midnight so it spans two days, (vi) invalid inputs that accompany the intent query 200. To illustrate, the test generation system 102 can generate the test code 206 to cover all test cases or the test generation system 102 can generate multiple test codes to cover each of the test cases.

As further shown in FIG. 2, the test generation system 102 utilizes an executor 208 to execute the test code 206 for generating a test result 210. As indicated in FIG. 2, by executing the test code 206 to determine whether the function code 204 satisfies the intent query 200, the test generation system 102 generates a test result 210. Specifically, the test result 210 reflects: (i) whether the function code 204 satisfies the intent query 200 (e.g., responds to the intent query 200 appropriately), (ii) whether the function code 204 contains syntactic errors, (iii) whether the function code 204 contains logical errors, and/or (iv) any additional issues with the function code 204 that causes the output of the function code to not respond to the intent query 200.

In some embodiments, the test generation system 102 may not execute the function code 204 at this stage (FIG. 2 illustrates a pre runtime diagram) but executes the test code 206 first to test the function code 204 before deployment. In particular, the test code 206 performs a function test on the function code 204. In one or more embodiments, the term "function test" refers to a computer test or a diagnostic process that determines whether the function code 204 performs a function relating to the intent query 200. Specifically, a function test tests the function code 204 to determine if the function code 204 includes methods, functions, definitions, and/or other computer logic to correctly an expected output defined by (one or more tasks or processes that make up) the intent query 200 (e.g., whether the function code responds to the intent query 200 of "when is my next meeting"). In some cases, a function test can also test the function code 204 for syntax errors, logic errors, and/or for harmful, unwanted, incompatible, or unauthorized functions or methods, depending on parameters of the target computer application that will implement the function code 204. As shown, the test generation system 102 generates a test result 210 that indicates the results of the function test.

As mentioned above, the test generation system 102 fine-tunes the large language model to generate the test code in tandem with the function code. As shown, FIG. 3 illustrates the test generation system 102 utilizing an example training set to fine-tune a large language model in accordance with one or more embodiments.

Figure 3:
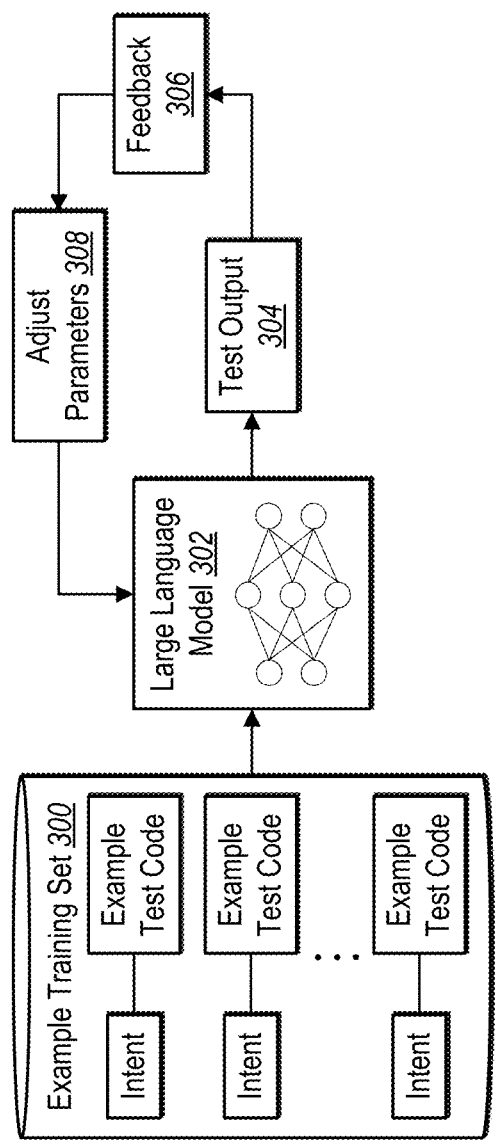
FIG. 3 illustrates an example diagram for the test generation system fine-tuning a large language model with an example training set in accordance with one or more embodiments.

As shown, FIG. 3 illustrates the test generation system 102 receiving an example training set 300 (e.g., a golden set). For instance, the example training set 300 includes a plurality of example test code and a plurality of corresponding intent queries. In other words, the example training set includes example test code validated and/or generated by engineering devices as validly testing function code for various intent queries. Accordingly, the example training set 300 contains a plurality of examples to fine-tune a large language model 302.

In one or more embodiments, the term "fine-tuning" refers to a process of adjusting parameters or weights of the large language model 302. Specifically, fine-tuning includes utilizing a pre-trained model (e.g., as a starting point) and refining the pre-trained model for a task such as generating test code that corresponds to function code.

As shown, the test generation system 102 fine-tunes the large language model 302 with the example training set 300. Specifically, the test generation system 102 utilizes the large language model 302 to process a prompt (e.g., an intent query). For instance, a prompt from the example training set 300 can include "schedule a meeting next week in the morning with my manager." In some embodiments, the test generation system 102 breaks down the prompt to multiple subcomponents such as (1) determining an availability of the user next week in the morning, (2) determining the manager of the user, and (3) determining an availability of the manager next week in the morning.

As shown in FIG. 3, the test generation system 102 then utilizes the large language model 302 to generate a test output 304 from the multiple subcomponents of the prompt (e.g., the intent query). In particular, the test generation system 102 generates the test output 304 that includes test code and/or function code for the prompt (e.g., "schedule a meeting next week in the morning with my manager"). Further, in some instances, the test generation system 102 executes the test output 304 (e.g., the generated test code) to perform a function test on the generated function code. In doing so, the test generation system 102 can further generate feedback 306 indicating whether the test output 304 adequately performs a function test on the function code (e.g., does the test output 304 validly test the function code for syntactic or logical errors). Specifically, the feedback 306 can include implicit feedback in the form of indications of executing or using the test output 304 or explicit feedback in the form of express indications (e.g., from a client device) that the test output 304 works or does not work.

As shown, the test generation system 102 performs an act 308 of adjusting parameters of the large language model 302 based on the feedback 306. Indeed, the test generation system 102 uses the feedback 306 to change how the large language model 302 processes data and generates one or more outputs. In particular, the feedback 306 indicates test results of executing the test code for function code corresponding to an intent query. Moreover, the test generation system 102 leverages the feedback 306 to modify how the test code is generated. For instance, the test generation system 102 utilizes the implicit feedback (e.g., which indicates results of executing the test code) to modify how the large language model 302 generates the syntax and/or logic of the test code. Further, the test generation system 102 utilizes the explicit feedback (e.g., which indicates whether the test code works or not) to generally modify how the large language model 302 identifies test code based on an incoming intent query. Thus, the test generation system 102 changes the operations of the large language model 302 based on the feedback 306 and learns to generate the test code from the example training set 300 (e.g., the golden set of example test code) over one or more training iterations.

The above description relates to adjusting parameters of the large language model 302 based on the feedback 306. In addition to adjusting parameters based on the feedback 306, in some embodiments (e.g. for fine-tuning the large language model 302), the test generation system 102 modifies parameters of the large language model 302 based on a measure of loss. For example, the test generation system 102 determines a measure of loss between a predicted output and a ground truth to fine-tune parameters of the large language model 302. Specifically, the test generation system 102 maps the subcomponents of the prompt to an embedding space of the large language model 302. From mapping the subcomponents of the prompt in the embedding space, the test generation system 102 can compare the subcomponents of the prompt with example intents from the example training set 300. For example, the test generation system 102 generates embeddings for the subcomponents of the prompt and example intents of the example training set 300. Moreover, the test generation system 102 further calculates a distance between the generated embeddings of the subcomponents and the generated embeddings of the example intents (e.g., from the example training set 300).

As part of the act 308 for adjusting parameters based on a measure of loss, the test generation system 102 can determine a cosine similarity or a Euclidean distance between the subcomponents and the example intents of the example training set 300. In doing so, the test generation system 102 matches the subcomponents with the closest example intents from the example training set 300. For instance, the test generation system 102 can determine a match between a subcomponent and an example intent based on an exact match, a closest match, or a threshold match (e.g., a similarity score of 0.80 and above constitutes a match).

Moreover, the test generation system 102 generates the test output 304 and compares the test output 304 with the ground truth exactly corresponding with the prompt or the ground truth closest in distance in the embedding space to the prompt. From the comparison, the test generation system 102 can determine a measure of loss and perform the act 308 of adjusting parameters of the large language model 302.

In some embodiments, the test generation system 102 may train the large language model 302 from the ground up (in addition or alternatively to fine-tuning). For instance, the test generation system 102 feeds as input an intent query to the large language model 302 and utilizes the large language model 302 to generate test code and function code responsive to the intent query. Moreover, the test generation system 102 compares the generated function code to a ground truth (or an example test code) from the example training set 300. From the comparison, the test generation system 102 determines a measure of loss and modifies parameters of the large language model 302.

To illustrate by way of an example, the test generation system 102 receives an input query (e.g., "meetings tomorrow") from a client device. In turn, the test generation system 102 feeds the intent query of "meetings tomorrow" to the large language model 302. From the intent query, the test generation system 102 can utilize the large language model 302 to generate function code and test code. Specifically, the test generation system 102 can utilize the test code to perform a function test on the generated function code (e.g., the generated function code can determine what meetings a user has tomorrow). For instance, the test generation system 102 utilizes the test code to test whether the function code contains an API call to a calendar application. Moreover, the test generation system 102 can also utilize the test code to test whether the function code satisfies the purpose of determining meetings for a date of "tomorrow," and test whether the function code contains valid logic and valid syntax.

Similar to fine-tuning the large language model 302, for training from the ground-up, the test generation system 102 can compare the generated test code with a ground truth test code. Moreover, the test generation system 102 can compare generated function code with a ground truth function code. From the comparison of the ground truth function code with the generated function code (and/or the comparison of the ground truth test code with the generated test code), the test generation system 102 can modify parameters of the large language model 302 to more accurately generate function code and/or test code.

In some embodiments, the test generation system 102 does not contain an exact ground truth match for an intent query. During training the large language model 302 from the ground-up, the test generation system 102 can identify a ground truth closest to the intent query by mapping the intent query to an embedding space of the large language model 302. Specifically, for the intent query (e.g. "meetings tomorrow"), the test generation system 102 maps the intent query to an embedding space of the large language model 302 and compares the embedding of the intent query with various intents in the example training set 300. From comparing the embeddings of the intent query to the embeddings of intents in the example training set 300, the test generation system 102 can identify a ground truth match (e.g., exact match, similarity match, or threshold match).

Similar to fine-tuning, the test generation system 102 can then generate the test output 304 from the intent query and compare the test output 304 with the closest identified ground truth. From the comparison, the test generation system 102 can determine a measure of loss to perform the act 308 of adjusting the parameters of the large language model 302.

Figure 4:
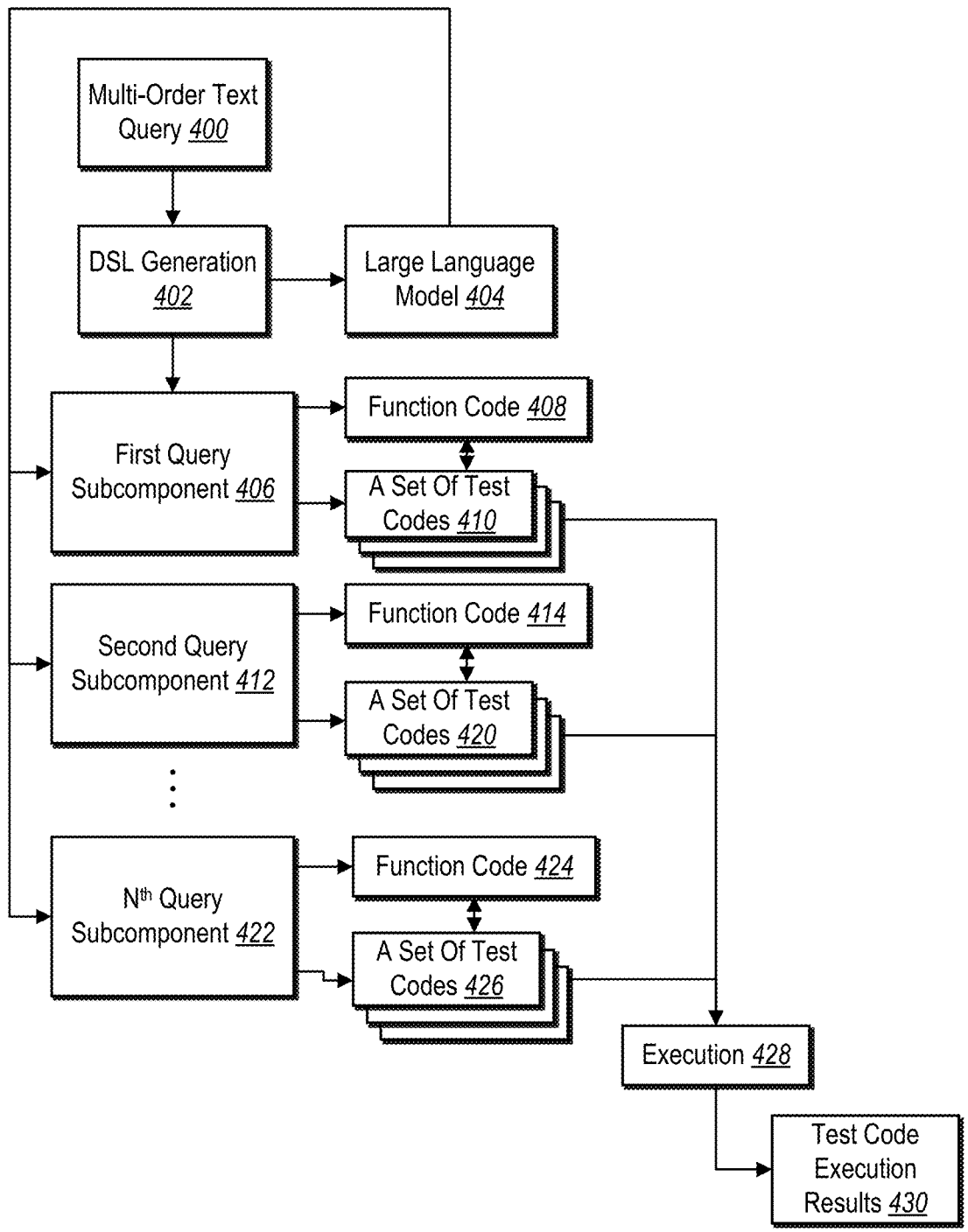
FIG. 4 illustrates an example diagram of the test generation system decomposing an intent query into multiple subcomponents and executing the test code in accordance with one or more embodiments.

As mentioned above, the test generation system 102 can decompose or deconstruct an intent query into multiple subcomponents. FIG. 4 illustrates the test generation system 102 receiving an intent query and decomposing the intent query into multiple query subcomponents to further generate function code and test code for each subcomponent.

As just mentioned, the test generation system 102 generates a query subcomponent from a multi-order text query 400. As used herein, the term "query subcomponent" refers to part of an overall intent query. Specifically, the query subcomponent defines a discrete process or task of function code where executing the query subcomponent accomplishes a portion of the overall intent query. To illustrate, the test generation system 102 executes all of the discrete processes (e.g., the query subcomponents) to satisfy the intent query.

As shown in FIG. 4, the test generation system 102 breaks down the multi-order text query 400 into separate components. In particular, each component broken down by the test generation system 102 indicates a data source. For instance, a first query subcomponent 406 can indicate a first data source and a second query subcomponent 412 can indicate a second data source. In some instances, the first query subcomponent 406 and the second query subcomponent can indicate the same data source.

As just mentioned, a query subcomponent can indicate a data source. For example, a data source relates to a location or system that contains data. In particular, a data source includes databases, spreadsheets, files, websites, browsers, social-networking platforms, and other sources of structured and unstructured data. For instance, data sources include structured and unstructured data that support various applications utilized on computing devices. Accordingly, data sources can include both internal or external data on an organizational level, a personal level, or an application level.

As shown in FIG. 4, the test generation system 102 performs an act 402 to generate domain-specific language (DSL). Specifically, the act 402 of DSL generation includes a plain language description and/or computer code referencing a data source. For example, the test generation system 102 performs DSL generation to tag portions of the multi-order text query 400. From tagging portions of the multi-order text query 400, the test generation system 102 utilizes the large language model 404 to generate computer code for a specific data source.

As shown in FIG. 4, the test generation system 102 provides generated domain-specific language(s) from the multi-order text query 400 to the large language model 404. Further, the test generation system 102 utilizes the large language model 404 to identify or extract multiple subcomponents from the multi-order text query 400. Specifically, the large language model 404 generates computer code for the multiple subcomponents compatible with the domain-specific languages.

To illustrate, the test generation system 102 utilizes the act 402 of DSL generation to break down the multi-order text query 400 into multiple steps, where each of the steps refer to a different software environment context and/or each require different software actions. In some cases, the test generation system 102 generates a separate domain-specific language segment for (e.g., that represents or defines) each of the steps. To illustrate, for the multi-order text query 400 of "what meetings with do I have tomorrow with the marketing team," the test generation system 102 generates a first domain-specific language segment for a "calendar application" (e.g., what meetings do I have tomorrow) and a second domain-specific language segment for "employee catalog application."

Each domain-specific language component can define its own step or action corresponding to its own contextual data source as a sub-part to answering the whole multi-order text query. In other words, the test generation system 102 utilizes the act 402 to craft a prompt to provide to the large language model 404 to be compatible with a specific step or action of the multi-order text query 400. As shown, the test generation system 102 utilizes the large language model 404 to generate test code and function code compatible with a particular query subcomponent.

In some embodiments, the function code can include an API to reference an external application. For example, an API includes a set of protocols, routines, and tools for building applications. In particular, an API provides a method for various software components, applications, or systems to communicate and exchange data with one another, regardless of the type of programming language, operating system, or hardware platforms used for each application environment. For instance, an API can include a set of rules that define the manner in which different software components interact, the format and structure of data exchange, the syntax and parameters of calls, and the methods for authentication.

As also shown, the test generation system 102 can generate multiple test codes for a single query subcomponent. In other words, the test generation system 102 generates multiple test cases to cover testing a specific function code. In one or more embodiments, a test case refers to a specific example used to evaluate the performance of the test generation system 102 responding to the intent query. Specifically, the test case can include one or more variations of expected outputs for a specific intent query. For example, for an intent query of the number of attendees for a specific meeting (e.g., meetings tomorrow), the test cases can include different days as the start time (e.g., different start times such as June 1st, June 1st at 3:00 p.m., June 8th at 12:00 a.m., etc.).

To illustrate, the multi-order text query 400 can include a query to determine "all managers that 'user A' has had a meeting within the last month." For example, the aforementioned query includes the first query subcomponent 406 of determining a current employee position (e.g., position on an employee hierarchy) of a user, the second query subcomponent 412 of determining the current month, a third query subcomponent of determining meetings that the user had within the last month, and a fourth query subcomponent (e.g., Nth query subcomponent 422) of determining attendees of the meetings that the user had within the last month.

Moreover, for the first query subcomponent 406, the test generation system 102 can generate domain specific language for an employee application (e.g., that contains an employee hierarchy) and a domain specific language of a calendar application for the second, third, and fourth subcomponent. For instance, the test generation system 102 can generate a set of test codes 410 (e.g., three different test codes) for the first query subcomponent 406 that performs a function test to determine 1) whether an API of function code 408 correctly queries an employee application, 2) whether the function code 408 returns a current employee position, and 3) whether the function code 408 is syntactically and logically valid.

Moreover, the test generation system 102 can generate a set of test codes 420 for the second query subcomponent 412 that performs a function test to determine 1) whether function code 414 correctly identifies the current month based on a current start date (e.g., whether the function code 414 correctly queries a client device system to obtain the current start date), and 2) whether function code 414 returns a period of time that covers "the last month." Further, the test generation system 102 can generate a set of test codes 426 (e.g., for function code 424) that performs a function test to determine whether an API of the function code correctly queries a calendar application to determine meetings/attendees of meetings based on the identified period of time.

As shown in FIG. 4, the test generation system 102 performs an act 428 of executing the test code. As shown, the test generation system 102 executes the set of test codes 410, the set of test codes 420, and set of test codes 426 to perform function tests on the function code 408, the function code 414, and the function code 424. From executing the sets of test codes, the test generation system 102 generates test code execution results 430 which indicates functional, syntactic, or logical errors in the function code generated by the large language model 404. Specifically, depending on the test code, the test code execution results 430 can indicate function code with errors and/or specific lines of computer code in the function code with errors. Moreover, the test generation system 102 can provide an option for a client device to re-generate function code or certain portions of function code utilizing the large language model 404 with an updated prompt to fix the current errors in the function code.

Figure 5A:
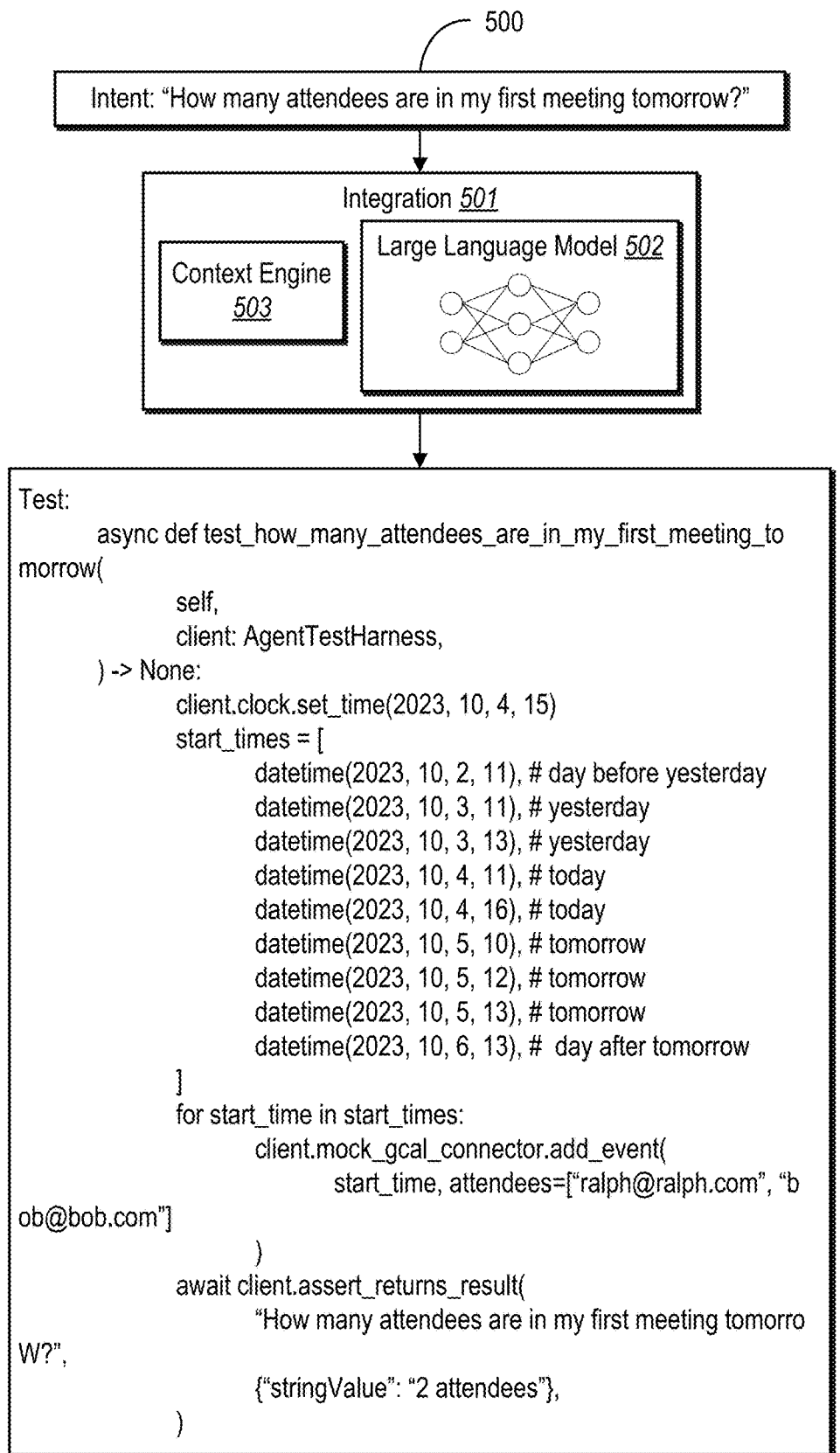
FIGS. 5A-5C illustrates an example diagram of the test generation system receiving an intent query and generating test code from the intent query in accordance with one or more embodiments.
Figure 5B:
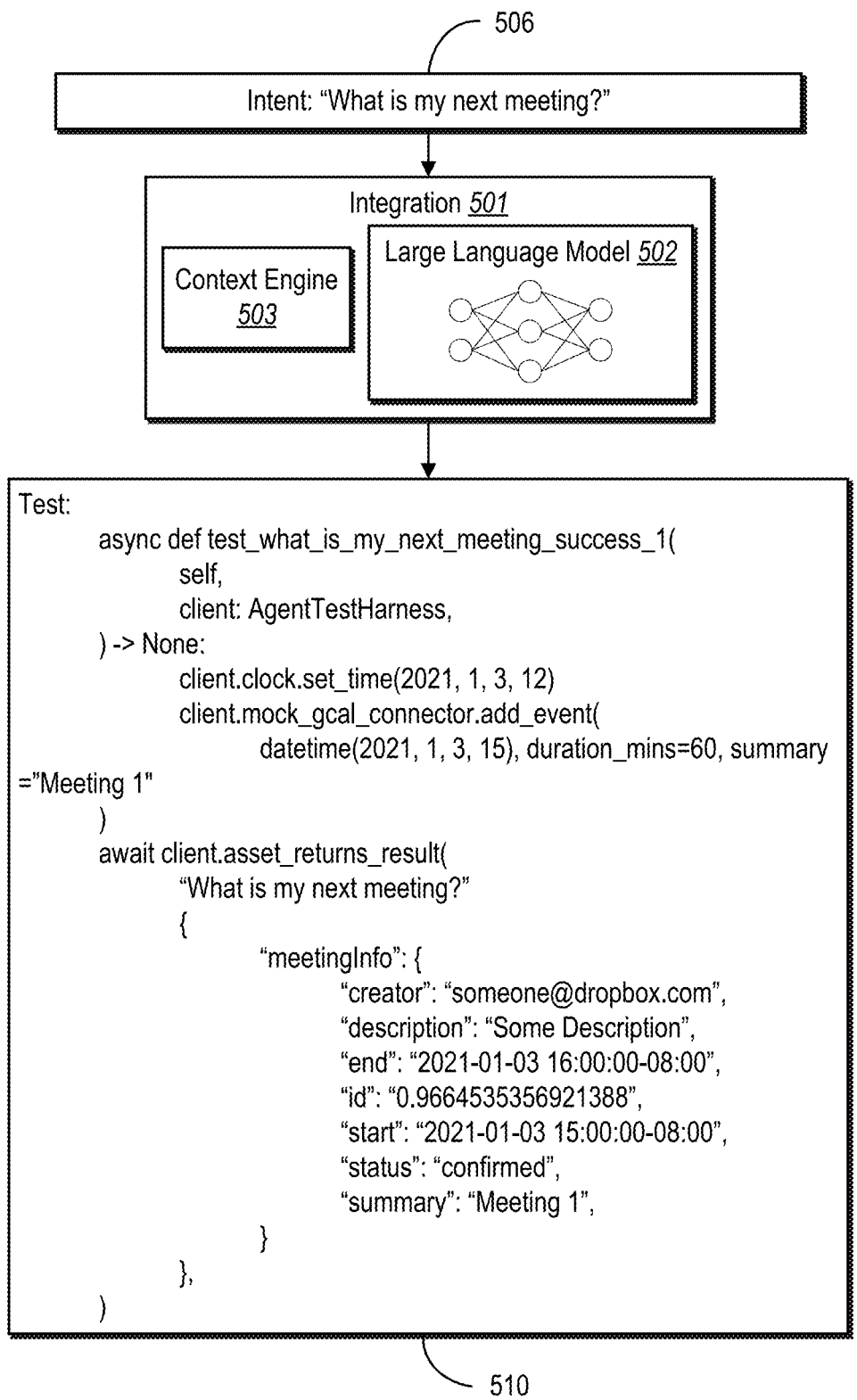
Figure 5C:
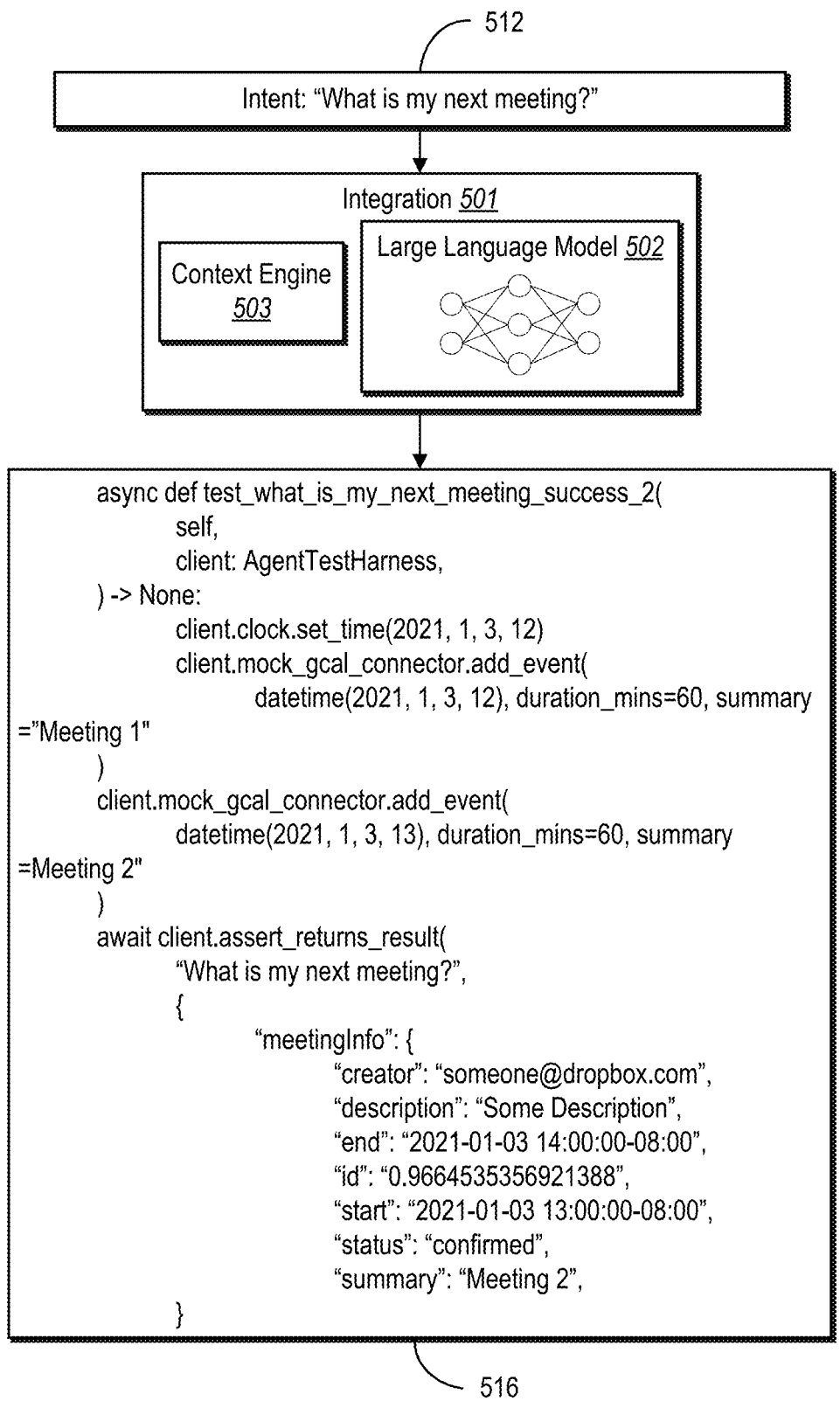

As mentioned above, the test generation system 102 generates test code that tests multiple test cases for a single intent query. FIGS. 5A-5C illustrate the test generation system 102 receiving an intent query and further utilizing a context engine integrated with a large language model to generate test code for the intent query in accordance with one or more embodiments. Specifically, FIG. 5A illustrates a diagram for generating test code from an intent query 500 of "how many attendees are in my first meeting tomorrow?" Thereafter, FIG. 5B illustrates a diagram for generating test code from an intent query 506 of "what is my next meeting?" Additionally, FIG. 5C also illustrates a diagram for generating test code from an intent query 512 of "what is my next meeting?"

As shown FIG. 5A, the test generation system 102 utilizes the integration 501 to generate the test code 504. Specifically, the test generation system 102 utilizes the integration 501 of the context engine 503 and the large language model 502 to break down the intent query 500 into query subcomponents. Furthermore, the test generation system 102 utilizes the large language model 502 to extract embeddings from the query subcomponents. From the extracted embeddings of the query subcomponent, the test generation system 102 can identify test code segments that map to the query subcomponents based on the training of the large language model 502 described above in FIG. 3. Additionally, the test generation system 102 combines the identified test code segments to generate a test, such as the test code 504 shown in FIG. 5A.

As shown, the test code 504 contains computer code indicating a client clock set-time of Oct. 4, 2023 at 15:00. Moreover, the test code 504 further includes code defining various start times (e.g., start_times [ ]) such as the day before yesterday (e.g., Oct. 2, 2023 at 11:00), yesterday at a first time (e.g., Oct. 3, 2023/at 11:00), yesterday at a second time (10/3/23 at 13:00), today at a first time (e.g., Oct. 4, 2023 at 11:00), today at a second time (e.g., Oct. 4, 2023 at 16:00), tomorrow at a first time (e.g., Oct. 5, 2023 at 10:00), tomorrow at a second time (e.g., Oct. 5, 2023 at 12:00), tomorrow at a third time (e.g., Oct. 5, 2023 at 13:00), and day after tomorrow (e.g., Oct. 6, 2023 at 13:00).

For instance, the test generation system 102 generates the start times based on the intent query 500. Specifically, the test generation system 102 breaks down the intent query 500 to determine a query subcomponent of "first meeting tomorrow." From the query subcomponent, the test generation system 102 identifies the closest intent in the embedding space of the large language model 502 and a corresponding portion of test code for the closest intent. Moreover, the test generation system 102 generates the portion of test code based on the corresponding portion of test code for the closest intent.

For the aforementioned start times, the test code 504 indicates a portion of test code 504 that ingests the start times and adds a calendar event for each of the start times. As shown, the computer code element of "client.mock_gcal_connector.add_event (start_time, attendees=["ralph@ralph.com", "bob@bob.com"]) indicates that for each of the added calendar events, ralph@ralph.com and bob@bob.com are attendees. In other words, the indicated portion of test code iterates over the aforementioned start times and for each start time, the test code adds an event to a mock calendar where the attendees for each meeting are Ralph and Bob.

Furthermore, the test generation system 102 generates a portion of the test code 504 that determines a number of attendees in a meeting that is occurring tomorrow based on the start times. Specifically, the code segment "await client.assert_return_result ("How many attendees are in my first meeting tomorrow", {stringValue": "2 attendees"},)" indicates an asynchronous function to determine whether the result of the intent query 500 ("how many attendees are in my first meeting tomorrow") has an expected value of "2 attendees." Similar to the start times, the test generation system 102 generates the portion of test code related to determining the number of attendees based on the intent query 500 containing the query subcomponent "how many attendees." As described above, the test generation system 102 identifies the closest intent in the embedding space of the large language model 502 and the corresponding portion of test code for the closest intent.

Thus, the test generation system 102 generates the test code 504 and executes the test code 504 to create mock events for each of the generated start times with Ralph and Bob as attendees. Accordingly, the test generation system 102 utilizes the test code 504 to perform a function test and determine whether the computer code correctly returns the expected result of two attendees.

In some embodiments, the test generation system 102 generates additional or alternative code segments within the test code 504. For example, additional code segments can include code to determine whether computer code generated by the integration 501 of the context engine 503 and the large language model 502 correctly determines a start time, correctly connects to a calendar application, and correctly determines a number of attendees.

As mentioned, FIG. 5B shows an intent query 506 of "what is my next meeting?" and corresponding test code for the intent query. As shown, the test generation system 102 utilizes the integration 501 of the context engine 503 and the large language model 502 to process the intent query 506 to generate test code 510. For instance, the test code 510 shows a client clock set time of Jan. 3, 2021 at 12:00 and also adding a mock calendar event on Jan. 3, 2021 at 15:00 where the duration is for sixty minutes, and the summary is "meeting 1."

Similar to FIG. 5B, the test generation system 102 identifies a query subcomponent of "next meeting" and generates a portion of the test code 510. Specifically, the test generation system 102 identifies the closest intent in the embedding space of the large language model 502 and the corresponding portion of test code for the closest intent based on the query subcomponent of "next meeting."

The subsequent portion of the test code 510 shown in FIG. 5B reads "await client.assert_returns_result ("what is my next meeting?", {"meetingInfo": {"creator": someone@dropbox.com, "description": "Some Description", "end": "2021 Jan. 3 16:00:00-08:00", "id": "0.9664535356921388", "start": "2021 Jan. 3 15:00:00-08:00", "status": "confirmed", "summary": Meeting 1",}},). In other words, the subsequent portion of the test code 510 also includes an asynchronous function (e.g., await) to determine whether the result (e.g., a function test of the function code) of the intent query 506 matches an expected output of the creator, the description, the start and end time, the summary, etc.

Thus, the test generation system 102 generates the test code 510 which includes mock test case for a creator, a description of the meeting, a start time of the meeting, an end time of the meeting. Further, the test generation system 102 executes code that answers the query of next meeting to determine whether the output of the executed code matches the mock test case.

Similar to FIG. 5B, FIG. 5C also shows an intent query 512 of "what is my next meeting?" For instance, FIG. 5C shows the test generation system 102 utilizing the integration 501 of the context engine 503 and the large language model 502 to generate test code 516. Specifically, the test code 516 shows a client clock set time of Jan. 3, 2021 at 12:00 with a mock calendar event of Jan. 3, 2021 at 12:00, a duration of sixty minutes, and a summary of "Meeting 1." Moreover, the test code 516 further shows an additional mock calendar event at Jan. 3, 2021 at 13:00 with a duration of sixty minutes and a summary of "Meeting 2."

In contrast to the test code 510 in FIG. 5B, the test code 516 in FIG. 5C has two calendar events with the current start time overlapping with the beginning of the first calendar event. As shown by the subsequent portion of the test code 516, the test code 516 tests whether the result for the intent query "what is my next meeting" matches an expected output of "Meeting 2."

Specifically, in FIG. 5C, the test generation system 102 utilizes integration 501 to test edge cases (e.g., unique circumstances that differ from a clean determination of a when a next meeting is to occur). For example, the test generation system 102 generates the test code 516 shown in FIG. 5C by identifying the query subcomponent of "next meeting" and generating an embedding for the query subcomponent. For instance, in the embedding space, the test generation system 102 can identify corresponding test code for the closest intent query that contains a test case of a current meeting overlapping with a current start time and a meeting occurring right after the current meeting. In some embodiments, the test generation system generates the test code 516 shown in FIG. 5C and the test code 510 shown in FIG. 5B to test a "normal case" and an "edge case." As mentioned above, the test generation system 102 further validates test code.

Figure 6:
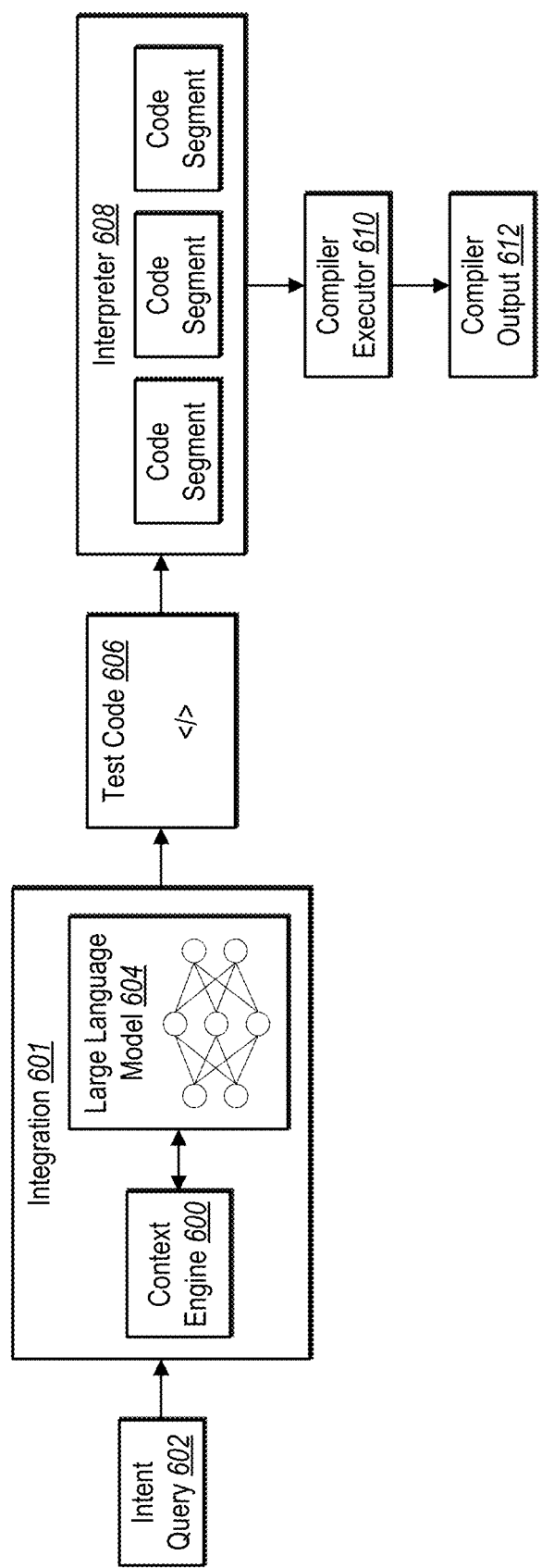
FIG. 6 illustrates an example diagram of the test generation system utilizing an interpreter to run a validation test on test code in accordance with one or more embodiments.

FIG. 6 illustrates the test generation system 102 utilizing the interpreter to execute test code at a compiler executor in accordance with one or more embodiments. As shown, the test generation system 102 receives an intent query 602 and utilizes an integration 601 of a context engine 600 with a large language model 604 to generate test code 606. Furthermore, the test generation system 102 utilizes an interpreter 608 to determine if the function code defines valid operations. In other words, the test generation system 102 utilizes the interpreter 608 to run test code prior to executing the test code with the executor described above in FIGS. 2 and 4.

In one or more embodiments, a "valid operation" refers to a syntactically and operationally correct form of the function code. Specifically, a valid operation can include the function code that validly generates an output. For example, valid operations of the function code can be determined according to the domain specific language and the data source that the function code relates to, and valid operations of the function code further includes it being executed without causing errors or performing unexpected behaviors.

Moreover, in some embodiments, the test generation system 102 determines that the function code contains an error when executing the test code 606. In one or more embodiments, an "error" refers to a deviation from the intended function of the function code. Specifically, the error can include syntax errors, runtime errors, logical errors, or semantic errors (e.g., the intent query was misunderstood).

In one or more embodiments, validating the test code refers to a test to determine that the function code is syntactically and semantically correct. In other words, the validation test refers to the test generation system 102 checking to ensure that the function code conforms with rules of a specific programming language. For example, the validation test includes the test generation system 102 determining whether the function code is correctly compiled and is ready for further execution.

As used herein, the term "executor" includes a runtime engine that executes computer code on a target platform. For example, the executor can refer to a program or application that includes executing computer code on behalf of the interpreter at a specific endpoint. For instance, the test generation system 102 via the executor implements an interpreter to execute computer code in a specific web browser, device, or operating system (e.g., the executor can execute the computer code at a client device that sent the text query to the test generation system 102). However, as shown in FIG. 6, the test generation system 102 utilizes a compiler executor 610 to execute test code 606 at test time to determine that the function code is safe for execution at run time. In other words, the test generation system 102 utilizes the interpreter 608 to test the test code for malicious/unsafe operations.

As used herein, the term "compiler executor" refers to a software component of the interpreter 608 that compiles and executes the test code 606. Specifically, the compiler executor 610 translates the test code 606 into machine-readable instructions and analyzes the code for various syntax errors to generate an executable file (e.g., intermediate code). Moreover, the test generation system 102 can utilize the compiler executor 610 to execute the compiled code.

In addition to testing for malicious/unsafe operations, in one or more embodiments, the test generation system 102 also tests the test code 606 for hallucinations. Specifically, the test generation system 102 can utilize the interpreter 608 to identify segments within the test code that are hallucinated. In other words, hallucinated portions of test code can refer to APIs, or segments of code that point to or reference aspects of the system environment that do not exist. To illustrate, in some embodiments, the test generation system 102 implements the context engine 600 that is connected to a specific application (e.g., a specific email application). Further, in some instances, the test generation system 102 generates test code for an email application that is not the specific email application, then the test generation system 102 identifies this hallucination using the interpreter 608. For instance, the test generation system 102 utilizes the compiler executor 610 to execute the test code 606 and identifies the code segment that references an email application as a hallucination.

In one or more embodiments, "safe for execution at run time" refers to the test generation system 102 determining whether the function code performs authorized actions. Specifically, "safe" refers to the function code performing actions of authorized reading, writing, or deleting of data stored for a user account. In other words, function code that reads, writes or deletes data that it is not authorized to read, write, or delete is considered not safe for execution at run time.

In some embodiments, the test generation system 102 executes the test code 606 and determines an error in compiler output 612. As used herein, the term "compiler output 612" refers to the test generation system 102 utilizing the compiler executor 610 to run the test code 606 and generating an expected output. Specifically, the expected output of running the test code 606 can include an analysis or diagnosis of whether the test code 606 adequately tests the function code. For example, the test generation system 102 generates the compiler output 612 which subsequently causes the test generation system 102 to generate and provide a feedback notification based on the compiler output 612 to a client device (e.g., an administrator device). As used herein, a feedback notification refers to an indication that references the error in the function code and the feedback notification is provided to an administrator device.

In one or more embodiments, an "administrator device" refers to a computing device with authorization for generating test code to fine-tune a large language model. Specifically, the administrator device receives the feedback notification that indicates one or more errors with function code. For instance, the administrator device receives a report that shows syntactic or logical errors, or that further shows certain security violations (e.g., actions in the computer code that performs unauthorized actions of reading, writing, or deleting). Moreover, the test generation system 102 can provide a feedback notification with specific recommendations of how to address one or more errors present in the function code.

In some embodiments, the test generation system 102 further prompts an administrator device to provide an additional prompt to address the identified error in the function code identified by the test code. For instance, based on the feedback notification, the test generation system 102 can generate an additional prompt that addresses the errors identified in the feedback notification and present the prompt to the administrator device. As such, the test generation system 102 can receive modifications to the additional prompt and can receive an indication of the administrator device submitting the additional prompt.

In response to the administrator device submitting the additional prompt, the test generation system 102 can further utilize the integration 601 of the context engine 600 and the large language model 604 to generate additional test code based on the additional prompt. From the additional test code, the test generation system 102 can further utilize the interpreter 608 to test the test code 606. Similar to the description above, the test generation system 102 further generates an additional feedback notification which indicates any additional errors in the additional test code.

Figure 7:
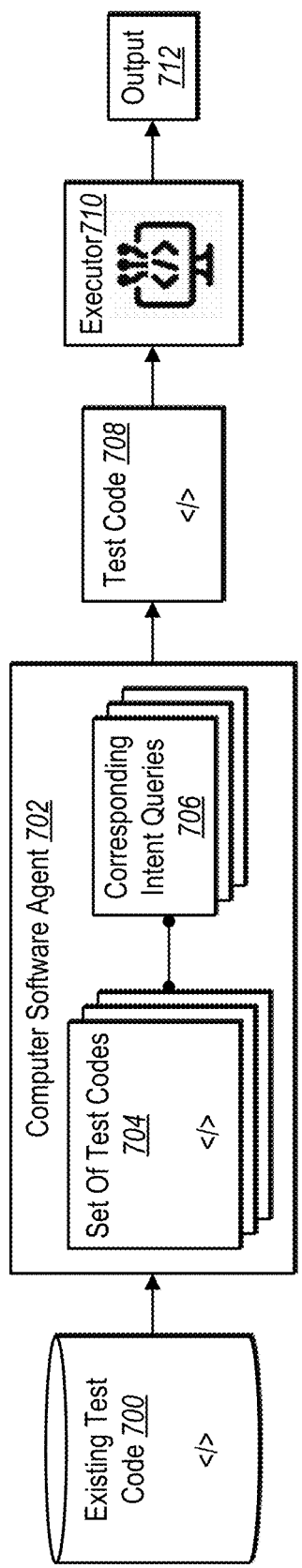
FIG. 7 illustrates an example diagram of the test generation system generating a computer software agent in accordance with one or more embodiments.

As mentioned above, in some embodiments, the test generation system 102 generates a computer software agent. FIG. 7 illustrates the test generation system 102 generating a computer software agent to execute prior tests in accordance with one or more embodiments.

In one or more embodiments, the test generation system 102 generates a computer software agent. Specifically, a "computer software agent" refers to computer software that executes one or more prior tests (e.g., the test generation system 102 avoids re-generating tests and utilizes prior tests) to determine whether function code satisfies one or more intent queries. For example, the test generation system 102 borrows from prior tests to create a test suite in an efficient manner without having to re-generate tests. For instance, the test generation system 102 tests a new intent query but identifies prior tests (e.g., existing test) to draw from first to compile a set of tests for testing the new intent query.

As shown in FIG. 7, the test generation system 102 draws from an existing test code 700 which is a database/repository of existing test code (e.g., previously generated test code). From the existing test code 700, the test generation system 102 extracts a set of test codes 704 with corresponding intent queries 706 to generate a computer software agent 702. For instance, the test generation system 102 creates/receives an intent query and (prior to utilizing the integration of the context engine and the large language model to generate new function code with corresponding test code) utilizes the computer software agent 702 to identify potential test code for the created/received intent query.

As shown, the test generation system 102 extracts a test code 708 as the identified potential test code. Further, the test generation system 102 utilizes an executor 710 to execute the test code 708 to generate an output 712. Specifically, the test generation system 102 can receive an intent query and utilize the computer software agent 702 to identify the test code 708 that is closest to the received intent query. In doing so, the test generation system 102 efficiently tests function code for the intent query by drawing from existing test code.

In one or more embodiments, the test generation system 102 utilizes the computer software agent 702 to compare the created/received intent query with the corresponding intent queries 706. Based on a level of similarity (e.g., a distance or a similarity score of the intent query with the corresponding intent queries 706) or the intent query satisfying a threshold similarity, the test generation system 102 can identify a test code from the set of test codes 704 to utilize for the created/received intent query. For instance, the test generation system 102 can utilize a machine learning model to generate tokens of the created/received intent query and compare the generated tokens with tokens to the corresponding intent queries 706. Based on a comparison of the tokens, the test generation system can determine a similarity score (e.g., cosine similarity or a distance between token embeddings).

In some embodiments, the test generation system 102 identifies two or more test codes from the set of test codes 704 to combine (e.g., to utilize as the test code for the created/received intent query). For instance, the corresponding intent queries 706 can include an intent query of "when is my first meeting tomorrow?" and "who is my meeting with tomorrow?" while the created/received intent query is "when is my first meeting tomorrow and who is it with?" Specifically, the test generation system 102 identifies that the created/received intent query is close in similarity to the intent query of "when is my first meeting tomorrow?" and "who is my meeting with tomorrow?" Based on this identification, the test generation system 102 utilizes the integration of the large language model and the context engine to generate an updated test code (e.g., based on the test code corresponding to the intent query of "when is my first meeting tomorrow?" and "who is my meeting with tomorrow?").

In some instances, the test generation system 102 determines that the computer software agent 702 does not contain test code to sufficiently test the created/received intent query. In response to this determination, the test generation system 102 utilizes the integration of the context engine and the large language model to generate additional test code (e.g., new test code) for the intent query.

Although FIG. 7 shows the computer software agent 702, in one or more embodiments, the test generation system 102 can generate multiple different computer software agents that include different sets of test code. Specifically, the computer software agent 702 shown in FIG. 7 can include the set of test codes 704 for calendar application and employee hierarchy related test code. Moreover, a first additional computer software agent can include a set of test codes for testing an email application and content item management applications. Furthermore, a second additional computer software agent can include a set of test codes for testing applications that contain content transcribed from meetings (e.g., for testing function code for an intent query related to determining the content of one or more previously held meetings, such as "what was discussed in my meeting last Thursday?").

FIGS. 1-7, the corresponding text, and the examples provide a number of different systems and methods for executing test code to determine that the function code satisfies the intent query. In addition to the foregoing, implementations can also be described in terms of flowcharts comprising acts steps in a method for accomplishing a particular result. For example, FIG. 8 illustrates an example series of acts for executing test code.

Figure 8:
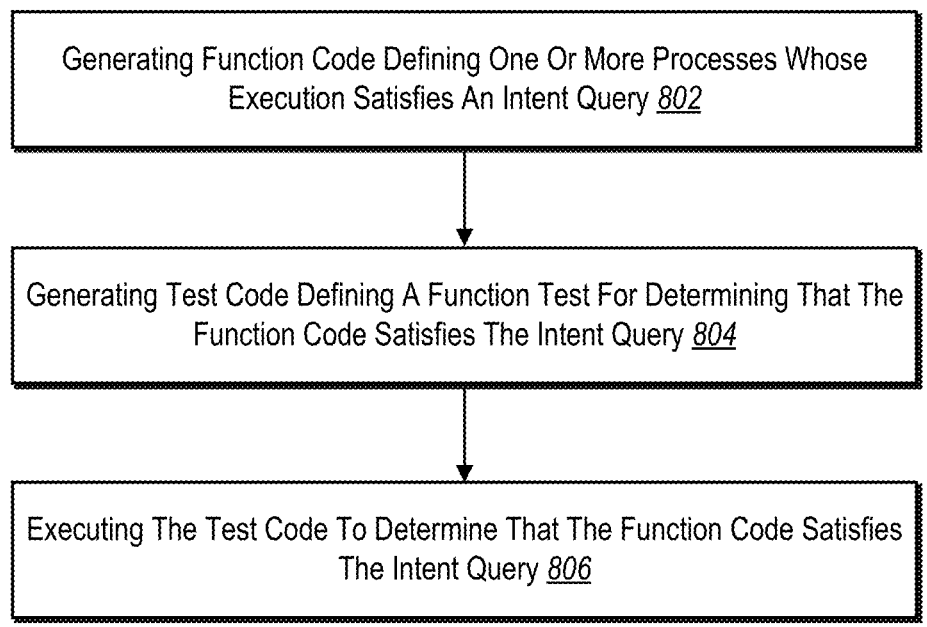
FIG. 8 illustrates an example series of acts performed by the test generation system in accordance with one or more embodiments.

While FIG. 8 illustrates acts according to certain implementations, alternative implementations may omit, add to, reorder, and/or modify any of the acts shown in FIG. 8. The acts of FIG. 8 can be performed as part of a method. Alternatively, a non-transitory computer-readable medium can comprise instructions, that when executed by one or more processors, cause a computing device to perform the acts of FIG. 8. In still further implementations, a system can perform the acts of FIG. 8.

As illustrated in FIG. 8, a series of acts 800 that may include an act 802 of generating function code defining one or more processes whose execution satisfies an intent query, an act 804 of generating test code defining a function test for determining that the function code satisfies the intent query, and an act 806 of executing the test code to determine that the function code satisfies the intent query.

In particular the act 802 includes generating, utilizing a large language model to process an intent query, function code defining one or more processes whose execution satisfies the intent query. Further, the act 804 includes generating, utilizing the large language model, test code defining a function test for determining that the function code satisfies the intent query. Moreover, the act 806 executing the test code to determine that the function code satisfies the intent query.

Further, in one or more embodiments the series of acts 800 includes fine-tuning the large language model by providing a first example test code and a first corresponding intent to the large language model. Additionally, in one or more embodiments the series of acts 800 includes providing a second example test code and a second corresponding intent to the large language model. Moreover, in one or more embodiments the series of acts 800 includes utilizing the large language model to generate the test code based on the first example test code and the second example test code.

Furthermore, in one or more embodiments the series of acts 800 includes decomposing the intent query into a plurality of query subcomponents, wherein the plurality of query subcomponents correspond to a plurality of data sources. Additionally, in one or more embodiments the series of acts 800 includes executing the test code based on decomposing the intent query. Moreover, in one or more embodiments the series of acts 800 includes generating the test code by generating computer code that tests the function code for a plurality of test cases corresponding to the intent query. Further, in one or more embodiments the series of acts 800 includes generating the test code by generating computer code corresponding to a data source relevant to the intent query. Moreover, in one or more embodiments the series of acts 800 includes executing the test code that references the data source to determine that an output of the test code responds to the intent query.

Further, in one or more embodiments the series of acts 800 includes determining, by the test code, that the function code defines valid operations generating an output. Moreover, in one or more embodiments the series of acts 800 includes executing the test code to determine an error in the function code. Additionally, in one or more embodiments the series of acts 800 includes generating a feedback notification for display on an administrator device based on determining the error in the function code. In one or more embodiments the series of acts 800 includes receiving an additional prompt from the administrator device executable by the large language model to fix the error identified in the function code by the test code.

Moreover, in one or more embodiments the series of acts 800 includes validating the test code by utilizing an interpreter that integrates with a compiler executor. Further, in one or more embodiments the series of acts 800 includes utilizing a context engine to generate prompts for the large language model according to the intent query, wherein the context engine is strongly typed and compatible across different versions of the large language model.

In one or more embodiments the series of acts 800 includes generating, utilizing a large language model to process an intent query comprising a plurality of query subcomponents, function code defining one or more processes whose execution satisfies the plurality of query subcomponents. Further, in one or more embodiments the series of acts 800 includes generating, utilizing the large language model, test code defining a function test for determining that the function code satisfies the plurality of query subcomponents. Moreover, in one or more embodiments the series of acts 800 includes executing the test code to determine that the function code satisfies the plurality of query subcomponents.

Further, in one or more embodiments the series of acts 800 includes providing a first example test code and a first corresponding intent to the large language model. Moreover, in one or more embodiments the series of acts 800 includes providing a second example test code and a second corresponding intent to the large language model. Additionally, in one or more embodiments the series of acts 800 includes utilizing the large language model to generate the test code based on the first example test code and the second example test code.

In one or more embodiments the series of acts 800 includes decomposing the intent query into the plurality of query subcomponents, wherein the plurality of query subcomponents corresponds to a plurality of data sources. Moreover, in one or more embodiments the series of acts 800 includes executing a first test code based on a first query subcomponent corresponding to a first data source and executing a second test code based on a second query subcomponent corresponding to a second data source. Furthermore, in one or more embodiments the series of acts 800 includes generating computer code that tests the function code for a plurality of test cases corresponding to each of the plurality of query subcomponents of the intent query.

Additionally, in one or more embodiments the series of acts 800 includes utilizing, at test time, an interpreter that integrates with a compiler executor that runs the function code to determine that the function code is safe for execution at run time.

Moreover, in one or more embodiments the series of acts 800 includes generating a computer software agent utilizing prior tests that comprise the test code, the intent query, and a plurality of additional test codes and corresponding intent queries. Further, in one or more embodiments the series of acts 800 includes utilizing the computer software agent to execute one or more prior tests corresponding to one or more intent queries.

In one or more embodiments the series of acts 800 includes generating, utilizing a large language model integrated with a context engine to process an intent query, function code defining one or more processes whose execution satisfies the intent query. Further, in one or more embodiments the series of acts 800 includes generating, utilizing the large language model integrated with the context engine, test code defining a function test for determining that the function code satisfies the intent query. Moreover, in one or more embodiments the series of acts 800 includes executing the test code to determine that the function code satisfies the intent query.

Additionally, in one or more embodiments the series of acts 800 includes generating the test code by generating computer code corresponding to a data source relevant to the intent query. Further, in one or more embodiments the series of acts 800 includes executing the test code that references the data source to determine that an output of the test code responds to the intent query. Moreover, in one or more embodiments the series of acts 800 includes to determining, by the test code, that the function code defines valid operations generating an output.

Additionally, in one or more embodiments the series of acts 800 includes generating the test code by utilizing the context engine to generate prompts for the large language model according to the intent query, wherein the context engine contains types of variables that are checked at compiled time and is compatible across different versions of the large language model. Further, in one or more embodiments the series of acts 800 includes validating the test code by utilizing an interpreter that integrates with a compiler executor.

The components of the test generation system 102 can include software, hardware, or both. For example, the components of the test generation system 102 can include one or more instructions stored on a computer-readable storage medium and executable by processors of one or more computing devices. When executed by one or more processors, the computer-executable instructions of the test generation system 102 can cause a computing device to perform the methods described herein. Alternatively, the components of the test generation system 102 can comprise hardware, such as a special purpose processing device to perform a certain function or group of functions. Additionally or alternatively, the components of the test generation system 102 can include a combination of computer-executable instructions and hardware.

Furthermore, the components of the test generation system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the test generation system 102 may be implemented as part of a stand-alone application on a personal computing device or a mobile device.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
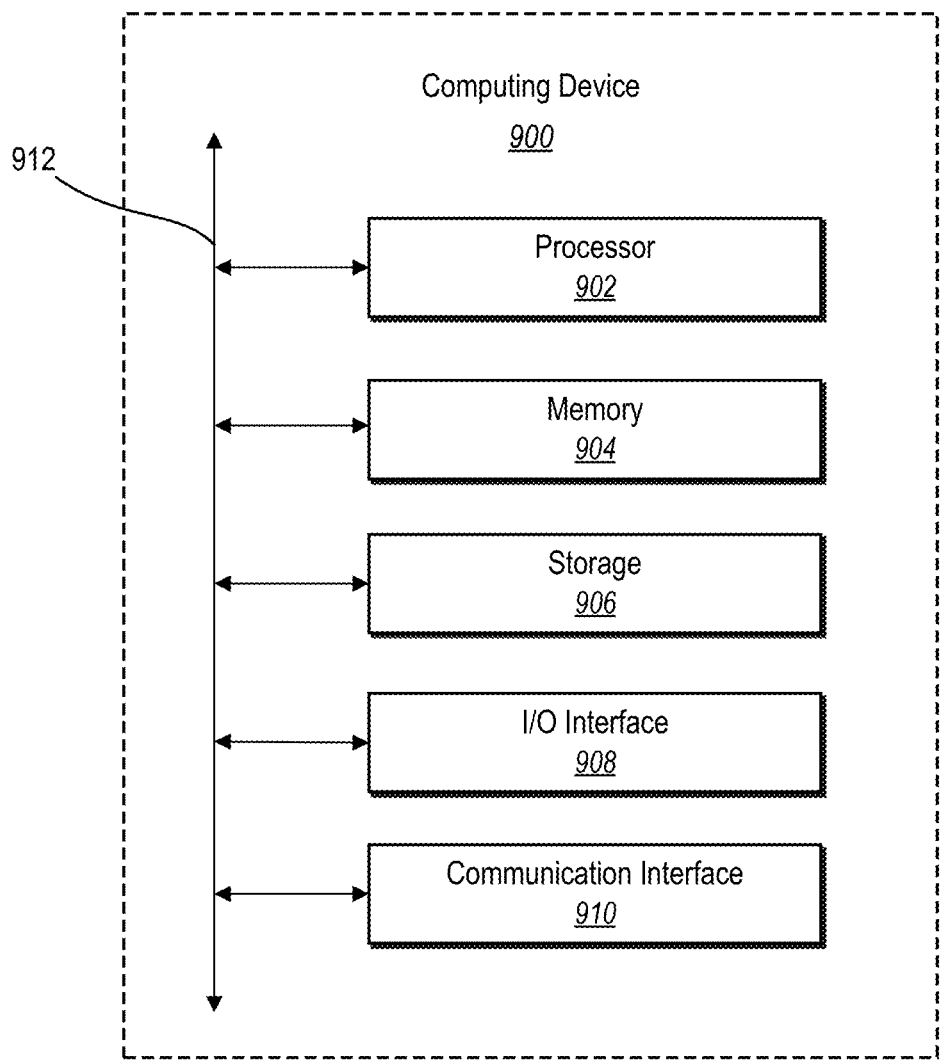
FIG. 9 illustrates a block diagram of an exemplary computing device in accordance with one or more embodiments.

FIG. 9 illustrates a block diagram of exemplary computing device 900 (e.g., the server(s) 104, the server(s) 114, and/or the client device 108) that may be configured to perform one or more of the processes described above. One will appreciate that server(s) 104 and/or the client device 108 may comprise one or more computing devices such as computing device 900. As shown by FIG. 9, computing device 900 can comprise processor 902, memory 904, storage device 906, I/O interface 908, and communication interface 910, which may be communicatively coupled by way of communication infrastructure 912. While an exemplary computing device 900 is shown in FIG. 9, the components illustrated in FIG. 9 are not intended to be limiting. Additional or alternative components may be used in other implementations. Furthermore, in certain implementations, computing device 900 can include fewer components than those shown in FIG. 9. Components of computing device 900 shown in FIG. 9 will now be described in additional detail.

In particular implementations, processor 902 includes hardware for executing instructions, such as those making up a computer program. As an example and not by way of limitation, to execute instructions, processor 902 may retrieve (or fetch) the instructions from an internal register, an internal cache, memory 904, or storage device 906 and decode and execute them. In particular implementations, processor 902 may include one or more internal caches for data, instructions, or addresses. As an example and not by way of limitation, processor 902 may include one or more instruction caches, one or more data caches, and one or more translation lookaside buffers (TLBs). Instructions in the instruction caches may be copies of instructions in memory 904 or storage device 906.

Memory 904 may be used for storing data, metadata, and programs for execution by the processor(s). Memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 904 may be internal or distributed memory.

Storage device 906 includes storage for storing data or instructions. As an example and not by way of limitation, storage device 906 can comprise a non-transitory storage medium described above. Storage device 906 may include a hard disk drive (HDD), a floppy disk drive, flash memory, an optical disc, a magneto-optical disc, magnetic tape, or a Universal Serial Bus (USB) drive or a combination of two or more of these. Storage device 906 may include removable or non-removable (or fixed) media, where appropriate. Storage device 906 may be internal or external to computing device 900. In particular implementations, storage device 906 is non-volatile, solid-state memory. In other implementations, Storage device 906 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 908 allows a user to provide input to, receive output from, and otherwise transfer data to and receive data from computing device 900. I/O interface 908 may include a mouse, a keypad or a keyboard, a touch screen, a camera, an optical scanner, network interface, modem, other known I/O devices or a combination of such I/O interfaces. I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 908 is configured to provide graphical data to a display for presentation to a user. The graphical data may be representative of one or more graphical user interfaces and/or any other graphical content as may serve a particular implementation.

Communication interface 910 can include hardware, software, or both. In any event, communication interface 910 can provide one or more interfaces for communication (such as, for example, packet-based communication) between computing device 900 and one or more other computing devices or networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 910 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 910 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 910 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 912 may include hardware, software, or both that couples components of computing device 900 to each other. As an example and not by way of limitation, communication infrastructure 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 10:
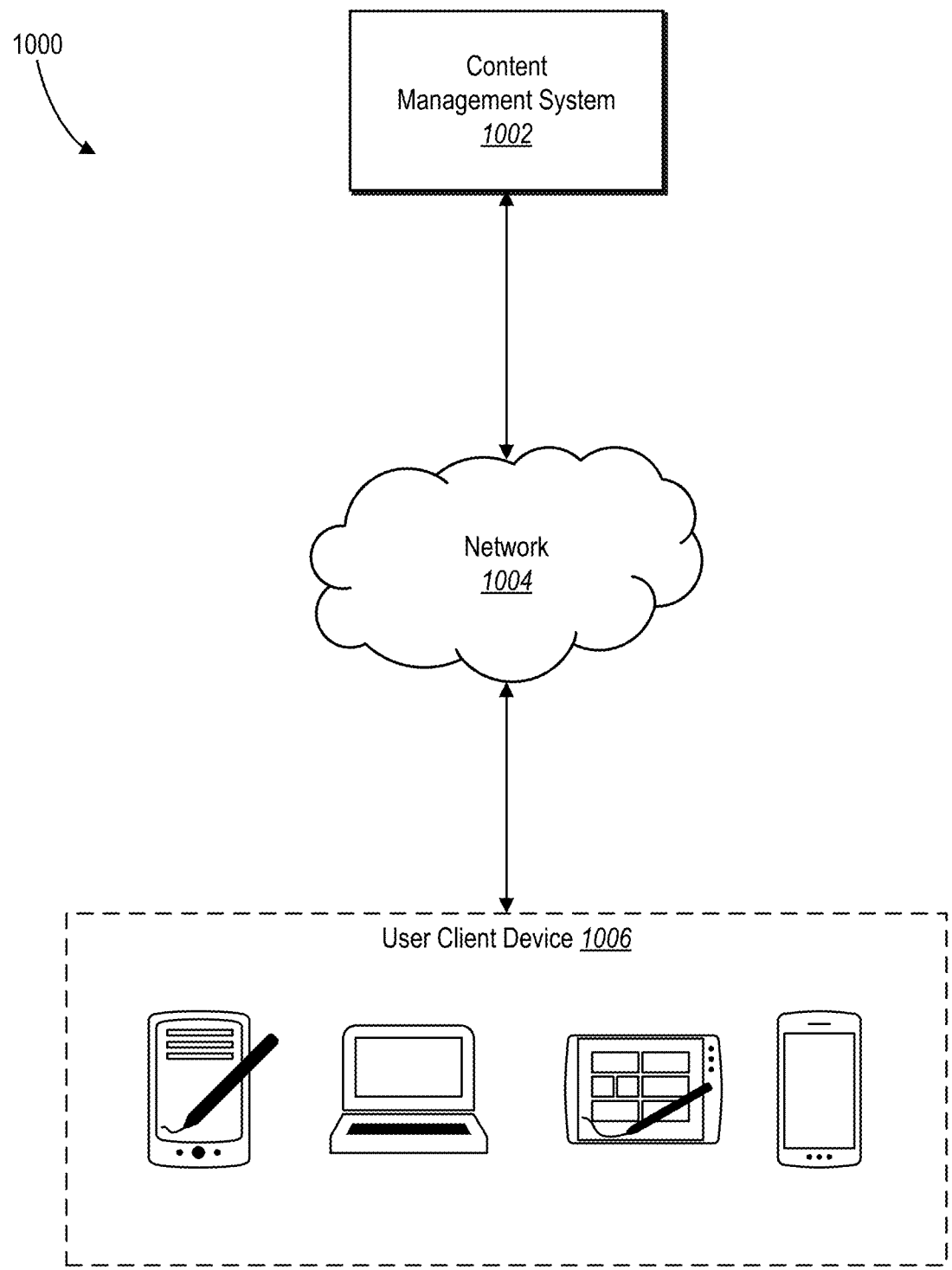
FIG. 10 illustrates an example environment of a networking system having the test generation system in accordance with one or more embodiments.

FIG. 10 is a schematic diagram illustrating environment 1000 within which one or more implementations of the test generation system 102 can be implemented. For example, the test generation system 102 may be part of a content management system 1002 (e.g., the content management system 106). Content management system 1002 may generate, store, manage, receive, and send digital content (such as digital content items). For example, content management system 1002 may send and receive digital content to and from client device of client devices 1006 by way of network 1004. In particular, content management system 1002 can store and manage a collection of digital content. Content management system 1002 can manage the sharing of digital content between computing devices associated with a plurality of users. For instance, content management system 1002 can facilitate a user sharing a digital content with another user of content management system 1002.

In particular, content management system 1002 can manage synchronizing digital content across multiple client devices 1006 associated with one or more users. For example, a user may edit digital content using a client device of the client device 1006. The content management system 1002 can cause client device of the client devices 1006 to send the edited digital content to content management system 1002. Content management system 1002 then synchronizes the edited digital content on one or more additional computing devices.

In addition to synchronizing digital content across multiple devices, one or more implementations of content management system 1002 can provide an efficient storage option for users that have large collections of digital content. For example, content management system 1002 can store a collection of digital content on content management system 1002, while the client device of the client devices 1006 only stores reduced-sized versions of the digital content. A user can navigate and browse the reduced-sized versions (e.g., a thumbnail of a digital image) of the digital content on client device of the client devices 1006. In particular, one way in which a user can experience digital content is to browse the reduced-sized versions of the digital content on client device of client devices 1006.

Another way in which a user can experience digital content is to select a reduced-size version of digital content to request the full- or high-resolution version of digital content from content management system 1002. In particular, upon a user selecting a reduced-sized version of digital content, client device of client devices 1006 sends a request to content management system 1002 requesting the digital content associated with the reduced-sized version of the digital content. Content management system 1002 can respond to the request by sending the digital content to client device of client devices 1006. Client device of client devices 1006, upon receiving the digital content, can then present the digital content to the user. In this way, a user can have access to large collections of digital content while minimizing the amount of resources used on client device of client devices 1006.

eClient device of client devices 1006 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. client device of client devices 1006 may execute one or more client applications, such as a web browser (e.g., MICROSOFT WINDOWS INTERNET EXPLORER, MOZILLA FIREFOX, APPLE SAFARI, GOOGLE CHROME, OPERA, etc.) or a native or special-purpose client application (e.g., DROPBOX PAPER for iPHONE or iPAD, DROPBOX PAPER for ANDROID, etc.), to access and view content over network 1004.

Network 1004 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client device of client devices 1006 may access content management system 1002.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   decomposing an intent query into multiple query subcomponents defining discrete portions of function code that, when executed, accomplish corresponding portions of the intent query;
   generating, using a context engine machine learning model integrated with a language model, a series of code generation prompts corresponding to the multiple query subcomponents which provide respective instructions to the language model to generate respective test codes corresponding to the discrete portions of function code based on structured programmatic data indicated within the multiple query subcomponents of the intent query;
   generating, utilizing the language model integrated with the context engine machine learning model, function code whose execution satisfies the corresponding portions of the intent query;
   generating, utilizing the language model, the respective test codes defining function tests for determining that the function code satisfies the multiple query subcomponents of the intent query; and
   executing the respective test codes to determine that the function code satisfies the multiple query subcomponents of the intent query.

2. The computer-implemented method of claim 1, wherein composing the intent query into multiple query subcomponents comprises breaking down natural language text in the intent query into multiple parts.

3. The computer-implemented method of claim 1, wherein:
   decomposing the intent query comprises utilizing the context engine machine learning model to decompose the intent query, wherein the multiple query subcomponents correspond to a plurality of data sources that relate to locations or systems that contain structured and unstructured data that support various applications utilized on computing devices;
   based on decomposing the intent query by utilizing the context engine machine learning model, generating the series of code generation prompts corresponding to the multiple query subcomponents; and
   executing the respective test codes generated from the series of code generation prompts according to the multiple query subcomponents corresponding to the plurality of data sources.

4. The computer-implemented method of claim 1, further comprising:
   generating the structured programmatic data of the intent query by tagging a first query subcomponent of the multiple query subcomponents with a first domain specific language tag; and
   generating the structured programmatic data of the intent query by tagging a second query subcomponent of the multiple query subcomponents with a second domain specific language tag, wherein the first domain specific language tag defines a first step corresponding to a first data source and the second domain specific language tag defines a second step corresponding to a second data source.

5. The computer-implemented method of claim 1, further comprising:
   generating a first test code of the respective test codes by generating computer code corresponding to a data source relevant to a first query subcomponent of the multiple query subcomponents; and
   executing the first test code that references the data source to determine that an output of the first test code responds to the first query subcomponent.

6. The computer-implemented method of claim 1, wherein executing the respective test codes comprises determining, by the respective test codes, that the function code defines valid operations generating an output.

7. The computer-implemented method of claim 1, further comprising:
   executing the respective test codes to determine an error in the function code;
   generating a feedback notification for display on an administrator device based on determining the error in the function code; and
   receiving an additional prompt from the administrator device executable by the language model to fix the error identified in the function code by the respective test codes.

8. The computer-implemented method of claim 1, further comprising validating the respective test codes by utilizing an interpreter that integrates with a compiler executor.

9. The computer-implemented method of claim 1, further comprising:
   integrating the context engine machine learning model with an additional language model, wherein the additional language model is an updated language model relative to the language model; and
   generating, utilizing the context engine machine learning model integrated with the additional language model, an additional series of code generation prompts for the additional language model according to additional intent queries, wherein parameters of the context engine machine learning model are compatible with updates or versions of language models different than the language model.

10. A system comprising:
at least one processor; and
a non-transitory computer-readable medium storing instructions which, when executed by the at least one processor, cause the system to:
- decompose an intent query into multiple query subcomponents defining discrete portions of function code that, when executed, accomplish corresponding portions of the intent query;
- generate, using a context engine machine learning model integrated with a language model, a series of code generation prompts corresponding to the multiple query subcomponents which provide respective instructions to the language model to generate respective test codes corresponding to the discrete portions of function code based on structured programmatic data indicated within the multiple query subcomponents of the intent query;
- generate, utilizing the language model integrated with the context engine machine learning model, function code whose execution satisfies the corresponding portions of the intent query;
- generate, utilizing the language model, the respective test codes defining a function tests for determining that the function code satisfies the multiple query subcomponents of the intent query; and
- execute the respective test codes to determine that the function code satisfies the multiple query subcomponents of the intent query.

11. The system of claim 10, further storing instructions which, when executed by the at least one processor, cause the system to fine-tune the language model by:
- providing a first example test code and a first corresponding intent to the language model;
- providing a second example test code and a second corresponding intent to the language model; and
- utilizing the language model to generate the respective test codes based on the first example test code and the second example test code.

12. The system of claim 10, further storing instructions which, when executed by the at least one processor, cause the system to:
- decompose the intent query utilizing the context engine machine learning model, wherein the multiple query subcomponents corresponds to a plurality of data sources that relate to locations or systems that contain structured and unstructured data that support various applications utilized on computing devices;
- based on decomposing the intent query by utilizing the context engine machine learning model, generate the series of code generation prompts corresponding to the multiple query subcomponents;
- execute a first test code of the respective test codes based on a first query subcomponent corresponding to a first data source; and
- execute a second test code of the respective test codes based on a second query subcomponent corresponding to a second data source.

13. The system of claim 10, further storing instructions, which when executed by the at least one processor cause the system to generate the respective test codes by generating computer code that tests a portion of the function code for a plurality of test cases corresponding to each of the multiple query subcomponents of the intent query.

14. The system of claim 10, further storing instructions, which when executed by the at least one processor cause the system to utilize, at test time, an interpreter that integrates with a compiler executor that runs the function code to determine that the function code is safe for execution at run time.

15. The system of claim 10, further storing instructions, which when executed by the at least one processor cause the system to:
- generate a computer software agent utilizing prior tests that comprise the respective test codes, the intent query, and a plurality of additional test codes and corresponding intent queries; and
- utilize the computer software agent to execute one or more prior tests corresponding to one or more intent queries.

16. A non-transitory computer-readable medium storing executable instructions which, when executed by at least one processor, cause the at least one processor to:
- decompose an intent query into multiple query subcomponents defining discrete portions of function code that, when executed, accomplish corresponding portions of the intent query;
- generate, using a context engine machine learning model integrated with a language model, a series of code generation prompts corresponding to the multiple query subcomponents which provide respective instructions to the language model to generate respective test codes corresponding to the discrete portions of function code based on structured programmatic data indicated within the multiple query subcomponents of the intent query;
- generate, utilizing the language model integrated with the context engine machine learning model, function code whose execution satisfies the corresponding portions of the intent query;
- generate, utilizing the language model integrated with the context engine machine learning model, the respective test codes defining function tests for determining that the function code satisfies the multiple query subcomponents of the intent query; and
- execute the respective test codes to determine that the function code satisfies the multiple query subcomponents of the intent query.

17. The non-transitory computer-readable medium of claim 16,
further storing instructions which, when executed by the at least one processor, cause the at least one processor to:
- generate the respective test codes by generating computer code corresponding to a plurality of data sources relevant to the intent query; and
- execute the respective test codes that references the plurality of data sources to determine that an output of the respective test codes responds to the intent query.

18. The non-transitory computer-readable medium of claim 16, further storing instructions which, when executed by the at least one processor, cause the at least one processor to determine, by the respective test codes, that the function code defines valid operations generating an output.

19. The non-transitory computer-readable medium of claim 16, further storing instructions which, when executed by the at least one processor, cause the at least one processor to:
- integrate the context engine machine learning model with an additional language model, wherein the additional language model is an updated language model relative to the language model; and
- generate, utilizing the context engine machine learning model integrated with the additional language model, an additional series of code generation prompts for the additional language model according to additional intent queries, wherein parameters of the context engine machine learning model contain types of variables that are checked at compile time and is compatible across updates or versions of language models different than the language model.

20. The non-transitory computer-readable medium of claim 16, further storing instructions which, when executed by the at least one processor, cause the at least one processor to validate the respective test codes by utilizing an interpreter that integrates with a compiler executor.

* * * * *